(12) United States Patent
Head

(10) Patent No.: US 7,049,506 B2
(45) Date of Patent: May 23, 2006

(54) CONDUCTOR SYSTEM

(76) Inventor: Philip Head, Gibbs House, Kennel Ride, Ascot, Berks, SL5 7NT (GB)

( * ) Notice: Subject to any disclaimer, the term of this patent is extended or adjusted under 35 U.S.C. 154(b) by 0 days.

(21) Appl. No.: 10/481,871

(22) PCT Filed: Jun. 20, 2002

(86) PCT No.: PCT/GB02/02818

§ 371 (c)(1),
(2), (4) Date: Jan. 16, 2004

(87) PCT Pub. No.: WO02/103854

PCT Pub. Date: Dec. 27, 2002

(65) Prior Publication Data

US 2004/0118590 A1    Jun. 24, 2004

(30) Foreign Application Priority Data

Jun. 20, 2001  (GB) ................................ 0115040.8
Aug. 11, 2001  (GB) ................................ 0119622.9
May 17, 2002  (GB) ................................ 0211385.0

(51) Int. Cl.
*H01B 7/34*    (2006.01)
(52) U.S. Cl. ..................................... 174/36; 174/102 R
(58) Field of Classification Search ................ 174/36, 174/102 R, 103, 105 R, 106 R, 108, 110 R, 174/113 R, 115, 117 R, 117 F, 117 FF; 138/123–139
See application file for complete search history.

(56) References Cited

U.S. PATENT DOCUMENTS

| 1,849,624 A | * | 3/1932 | Hochstadter | ............ 174/26 G |
| 1,849,873 A | * | 3/1932 | Hochstadter | ............ 174/26 R |
| 2,177,508 A | | 10/1939 | Abbott | |
| 4,028,660 A | * | 6/1977 | Pitts, Jr. | ............ 340/854.9 |
| 4,077,022 A | * | 2/1978 | Pitts, Jr. | ............ 333/1 |
| 4,583,804 A | * | 4/1986 | Thompson | ............ 439/588 |
| 4,626,619 A | * | 12/1986 | Uematsu | ............ 174/106 SC |
| 4,780,574 A | * | 10/1988 | Neuroth | ............ 174/102 D |
| 4,783,576 A | * | 11/1988 | Silver et al. | ............ 174/25 R |
| 4,814,547 A | | 3/1989 | Riley | |
| 4,859,024 A | * | 8/1989 | Rahman | ............ 385/112 |
| 5,086,196 A | * | 2/1992 | Brookbank et al. | ...... 174/106 R |
| 5,426,264 A | * | 6/1995 | Livingston et al. | ...... 174/102 R |

(Continued)

FOREIGN PATENT DOCUMENTS

DE        31 06 240        9/1982

(Continued)

*Primary Examiner*—William H. Mayo, III
(74) *Attorney, Agent, or Firm*—Herbert Dubno

(57) ABSTRACT

A protected conduit for use in a downhole environment, e.g. in a well, which has first and second metallic impermeable layers and an extrudate layer between the impermeable layers. A conductor extends between the two metal impermeable layers and serves for the transmission of power or telemetry data. A flow path is also present for a fluid through the first impermeable metal layer.

3 Claims, 23 Drawing Sheets

U.S. PATENT DOCUMENTS

| | | | | |
|---|---|---|---|---|
| 5,431,759 A | * | 7/1995 | Neuroth | 156/53 |
| 5,493,626 A | * | 2/1996 | Schultz et al. | 385/101 |
| 5,528,824 A | * | 6/1996 | Anthony et al. | 29/828 |
| 5,713,415 A | * | 2/1998 | Bridges | 166/60 |
| 5,782,301 A | * | 7/1998 | Neuroth et al. | 166/302 |
| 5,833,490 A | | 11/1998 | Bouldin | |
| 5,918,641 A | * | 7/1999 | Hardy et al. | 138/132 |
| 6,179,269 B1 | * | 1/2001 | Kobylinski | 254/134.3 R |
| 6,255,592 B1 | * | 7/2001 | Pennington et al. | 174/103 |
| 6,297,455 B1 | * | 10/2001 | Wijnberg et al. | 174/113 R |

FOREIGN PATENT DOCUMENTS

| | | |
|---|---|---|
| GB | 1 523 589 | 11/1974 |
| GB | 2 208 191 | 3/1989 |
| GB | 2 321 128 | 7/1998 |
| GB | 2 325 332 | 11/1998 |
| GB | 2 361 352 | 10/2001 |
| JP | 2 304814 | 12/1990 |
| JP | 11 176249 | 7/1999 |

* cited by examiner

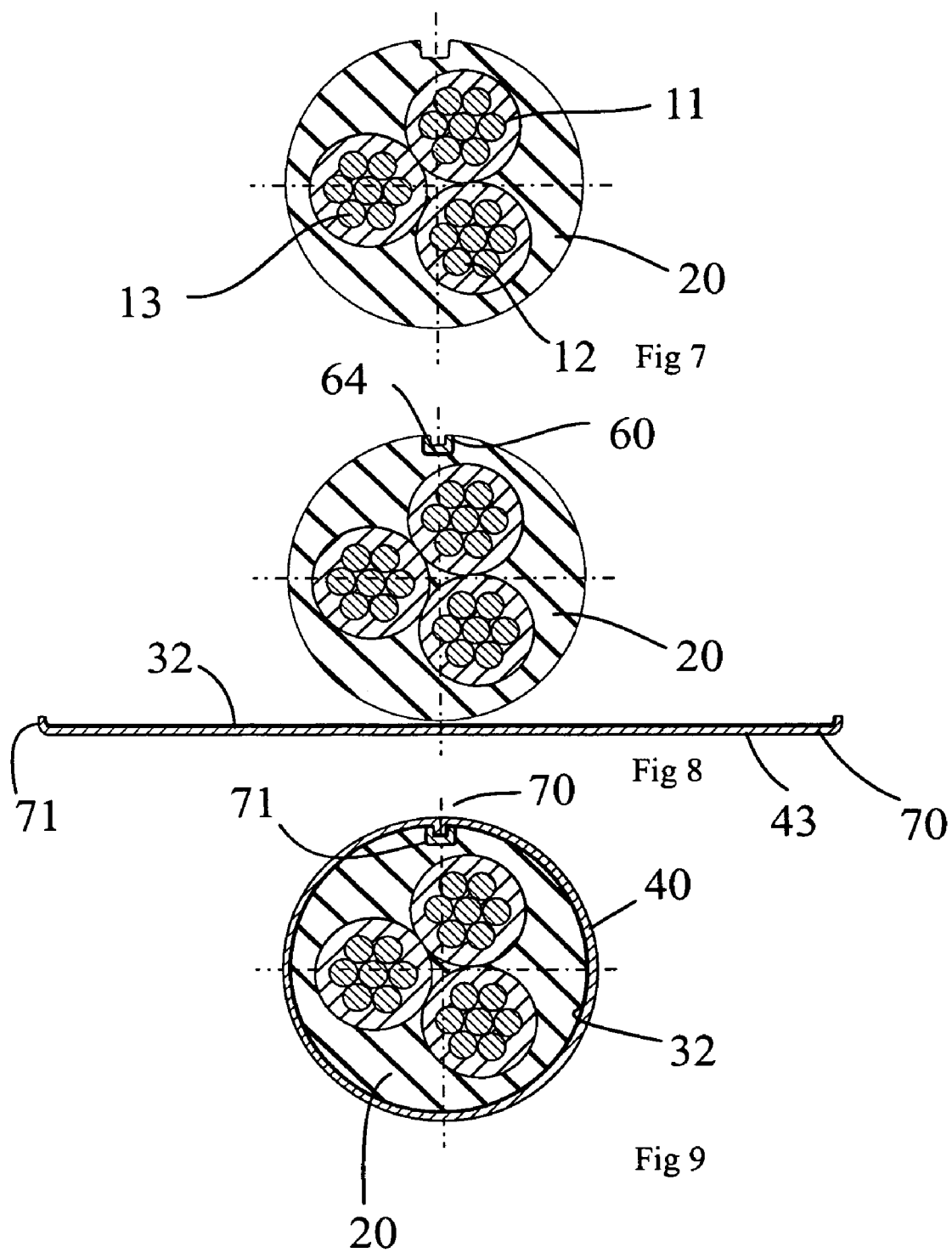

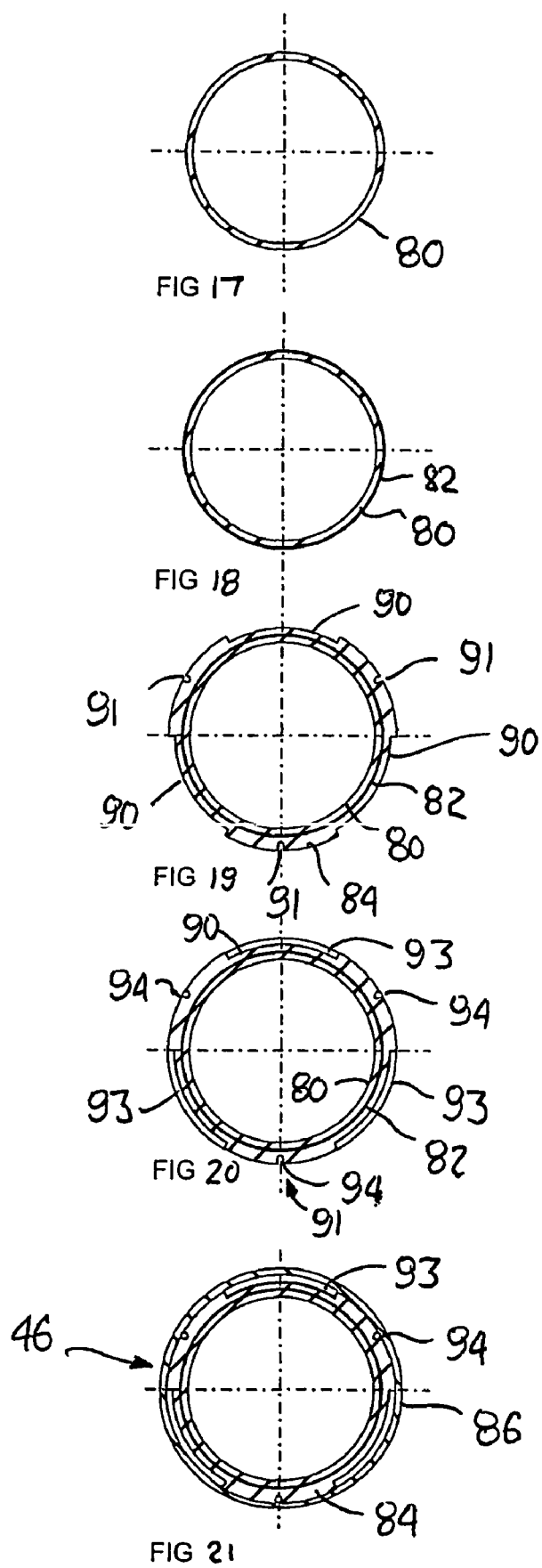

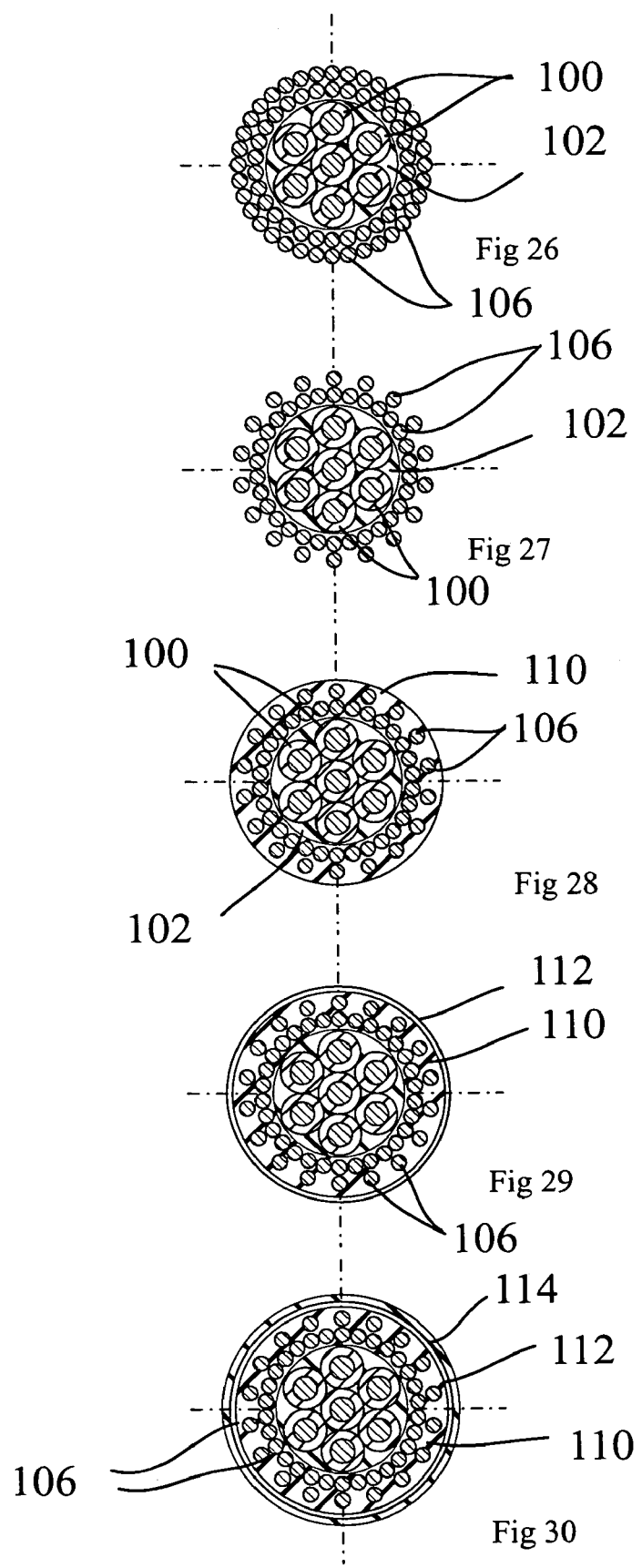

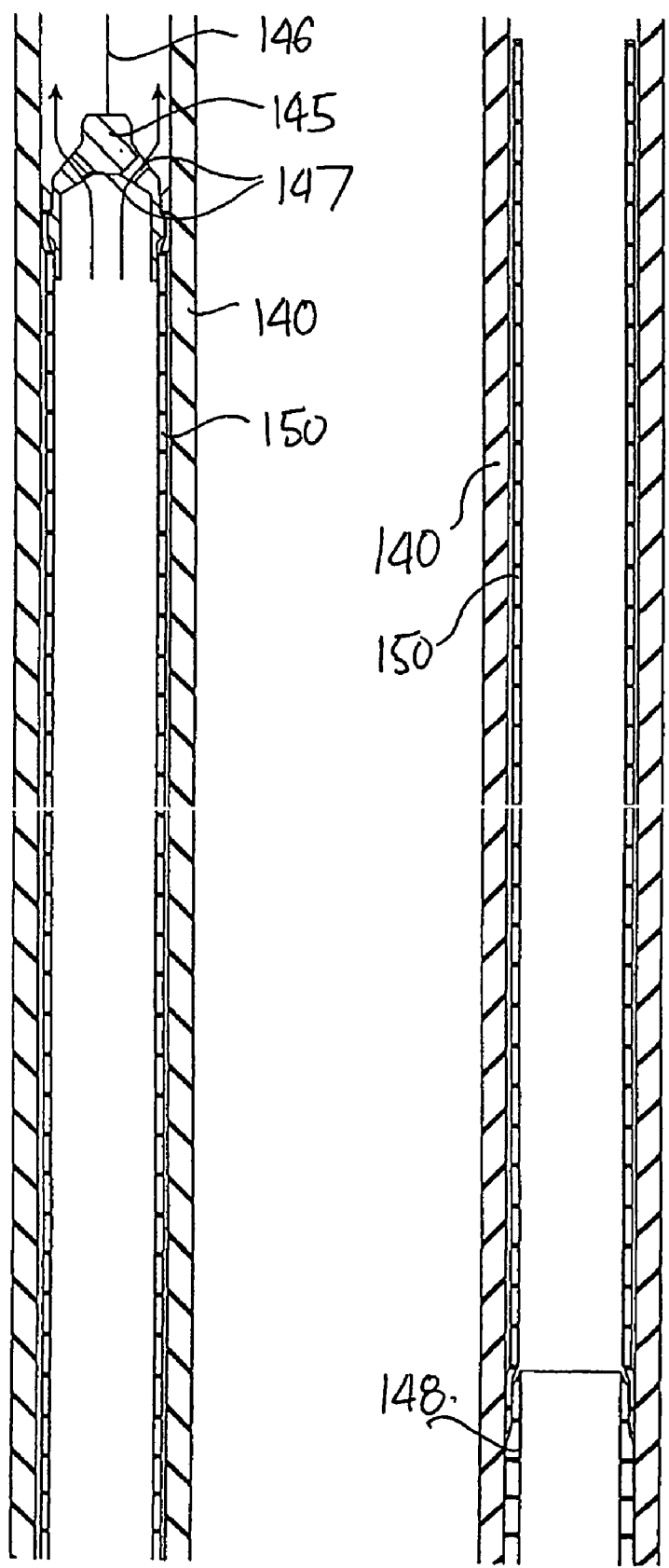

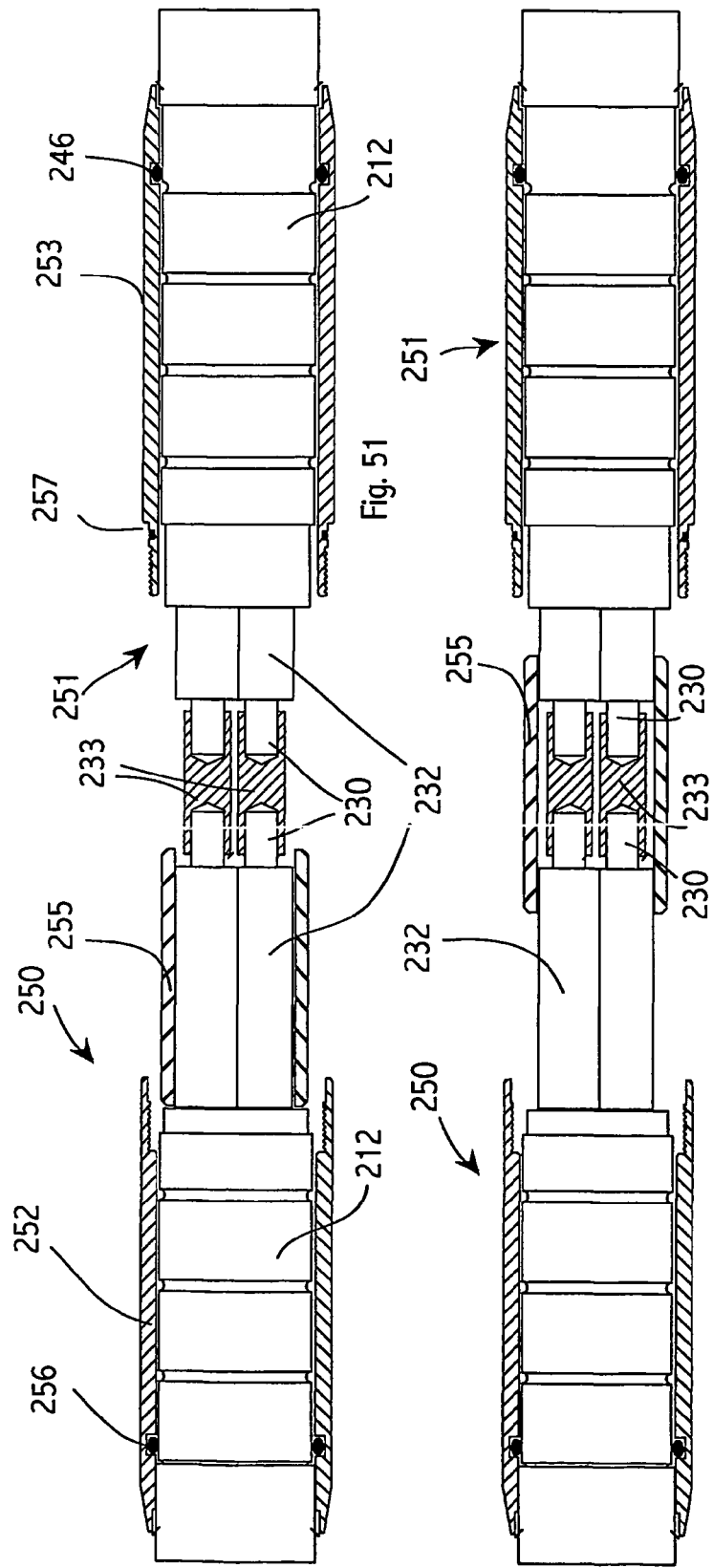

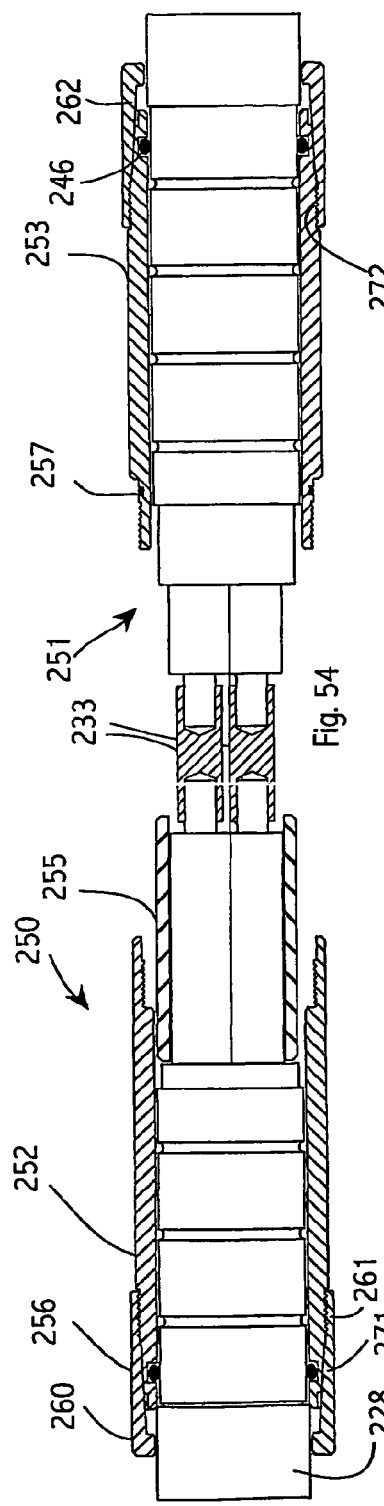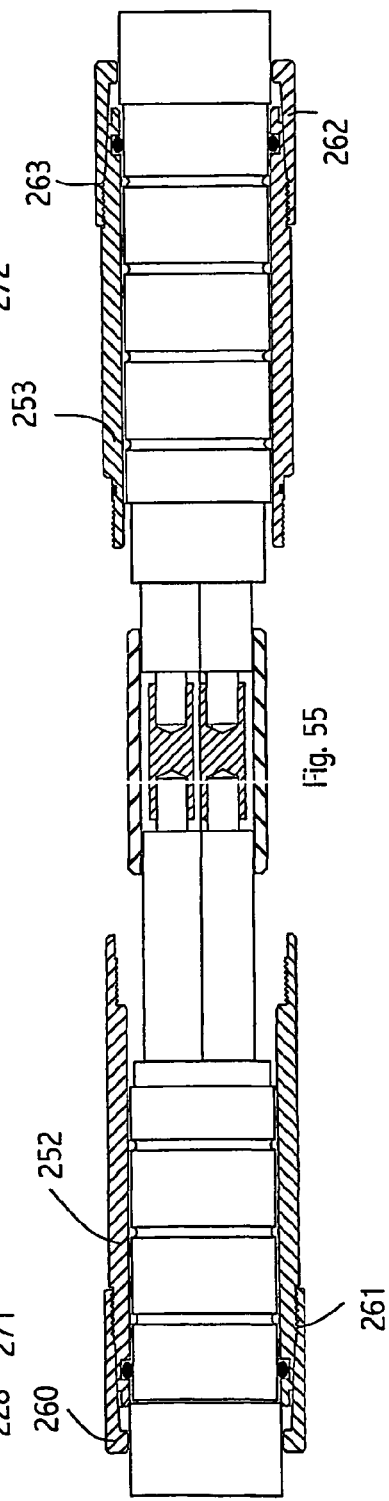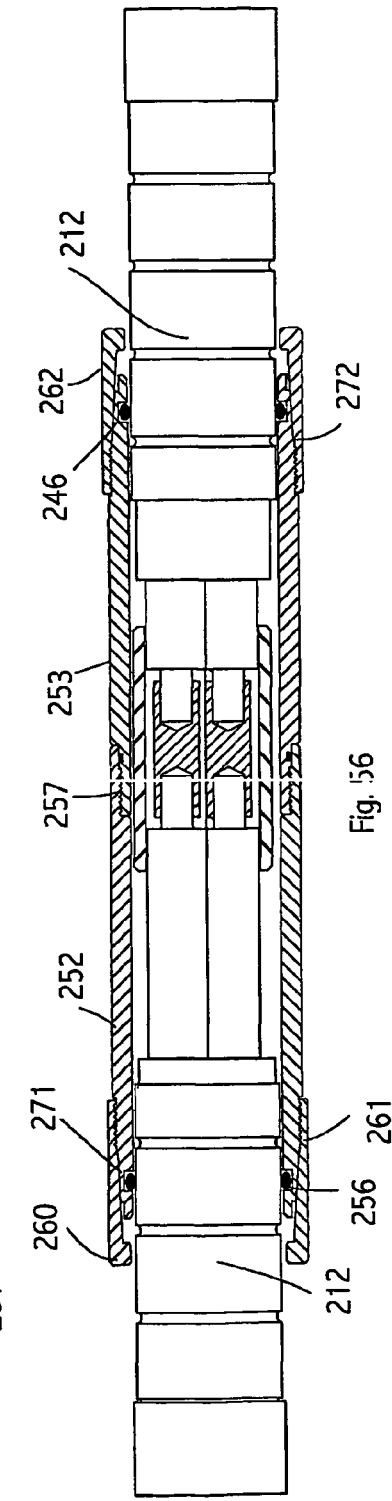

CONDUCTOR SYSTEM

CROSS REFERENCE TO RELATED APPLICATIONS

This is a national stage of PCT/GB02/02818 filed 20 Jun. 2002 and is based upon U.K. national application 011 50 40.8 of 20 Jun. 2001, 011 96 22.9 of 11 Aug. 2001 and 02 11 385.0 of 17 May 2002 under the International Convention.

FIELD OF THE INVENTION

This invention relates to conductor and conduit systems, particularly but not exclusively in sub-sea and sub-surface environments, for the production of oil and gas and associated tasks.

BACKGROUND OF THE INVENTION

Conductor systems such as armored cables are much used in the drilling of boreholes and the subsequent production of oil, both to supply power and to transmit signals. The conditions that such conductor systems encounter are harsh; cabling may be subjected to the high pressures of the well fluid, mechanical stresses from being pulled upon or compressed by surrounding components, and high temperatures.

Other types of line that may be used in these environments, such as hydraulic and fiber optic lines, must be designed with the same considerations in mind.

Known armored cable is typically formed by wrapping multiple layers of different material around the conductors or piping to be protected. The complex production process results in armored cable being relatively expensive.

A major problem identified with existing power cables is that gas migrates into the conductor; some gas, such as hydrogen sulphide, is highly corrosive to the copper typically used for conductors. Also, the gas permeates slowly under high pressure. If the cable suddenly decompressed (for example a seal of a pump fails) the gas in the cable expands and can cause the cable to explode.

OBJECTS OF THE INVENTION

It is an object of the present invention to provide a reliable conductor or conduit system that is convenient to manufacture. Other objects of the invention will become apparent from time to time in the description.

SUMMARY OF THE INVENTION

According to the present invention there is provided a method of forming a connection to a cable for transmitting power or telemetry data in a down hole environment, the cable including a conductor, and a tubular metallic impermeable layer around the conductor, comprising exposing the end of the conductor, introducing the conductor to a bore in a housing, the bore containing an electrical contact which abuts the conductor, the housing sealing against the metallic impermeable layer to isolate the bore of the housing.

Preferably the cable includes an outer coating, this outer coating being removed to expose the metallic impermeable layer.

According to another aspect of the present invention there is provided a method of forming a protected cable for transmitting power or telemetry data in a down hole environment, comprising the steps of feeding the cable through an extruder to form a first layer of extrudate substantially encompassing the cable, applying a metal impermeable tube of a larger diameter than the first layer of extrudate around the first layer of extrudate, and swaging the metal impermeable tube so that it is close fitting to the first layer of extrudate.

An adhesive layer may be provided between the first layer of extrudate and the metal impermeable tube. The metal impermeable tube may be applied as a sheet and formed into a tube.

According to another aspect of the present invention there is provided a protected conduit for use in a down hole environment, comprising a first tubular metal impermeable layer, a first extrudate layer applied upon the first metal impermeable layer, and a second metal impermeable layer applied upon the first extrudate layer, a flow path being present through the first metal impermeable layer, and a conducting means for transmitting power or telemetry data being provided between the first metal impermeable layer and the second metal impermeable layer.

Preferably, the conducting means comprises three parallel mutually 15 insulated conductors.

According to another aspect of the present invention there is provided a protected cable for transmitting power or telemetry data in a down hole environment, comprising conductive cable, a first extrudate layer applied upon 20 the cable, a first metal impermeable layer applied upon the first extrudate layer, and a plurality of tensile support members applied upon the first metal impermeable layer.

The tensile support members are preferably applied upon the first metal 25 impermeable layer in a braided configuration.

It will be seen that the above processes can conveniently incorporate an impermeable layers and/or heating elements to protect the power lines, conduits and other components from contamination by fluid or gas. Reference to cable includes electrically conductive cable, and hollow cable which allows fluid passage.

BRIEF DESCRIPTION OF THE DRAWING

The invention will now be described, by way of example, reference being made to the accompanying drawing, in which:

FIGS. 7 to 9 are cross sectional views of the manufacture of another embodiment of the cable.

FIGS. 17 to 21 are cross sectional views of the manufacture of another embodiment of the cable.

FIGS. 22 to 30 are cross sectional views of the manufacture of another embodiment of the cable.

FIGS. 32 and 33 are longitudinal sectional views of the cable of FIGS. 17 to 21 installed in a well riser.

FIGS. 41, 42 show a side view of this embodiment of the partially manufactured cable.

FIGS. 51 to 53 show partially sectional side view of the splicing of the ends of two pieces of this embodiment of the cable.

FIGS. 54 to 56 show partially sectional side view an modification of the 15 splicing of the ends of two pieces of this embodiment of the cable.

SPECIFIC DESCRIPTION

Figure 1:
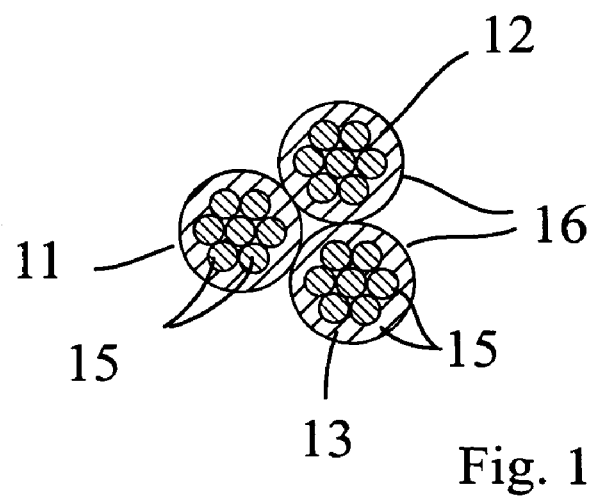
FIG. 1 is a cross sectional view of the power lines.
Figure 2:
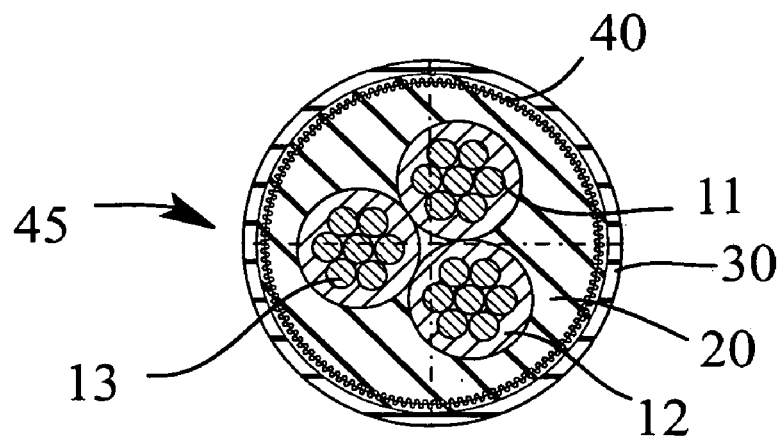
FIG. 2 is a cross sectional view of the cable.
Figure 3:
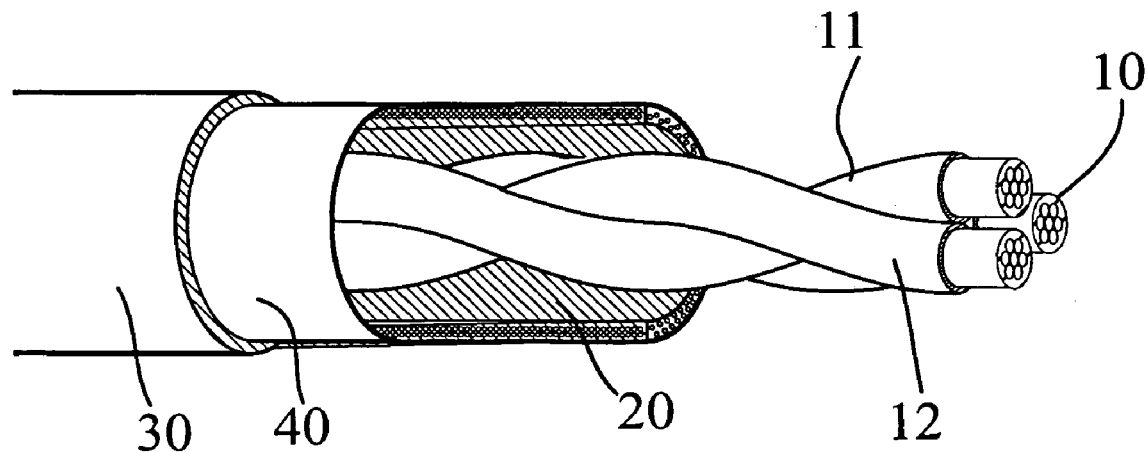
FIG. 3 is a partially cut-away perspective view of the cable.

Referring to FIG. 1, three power lines 10, 11, 12, each comprising a seven strand conductor 15 encased in a plastic sheath 16, are positioned together in an intertwined platted arrangement as shown in FIG. 3. Referring to FIG. 2, to protect the power lines 10, 11, 12, they are encased together within a plastic cylinder 20. A impermeable layer 40 encloses this plastic cylinder 20. Conveniently, this impermeable layer could be sheet steel, though of course it could be others impermeable metals or even other impermeable materials. Around this impermeable layer, a further plastic layer 30 is formed. These components together form the armored cable 45 (the term cable 45 shall be used also to refer to the partially completed cable during its manufacture). The conductor could also be pre-formed with a plastic extrusion coating avoiding steps 1 and 2 shown in FIGS. 1 and 2.

Figure 4:
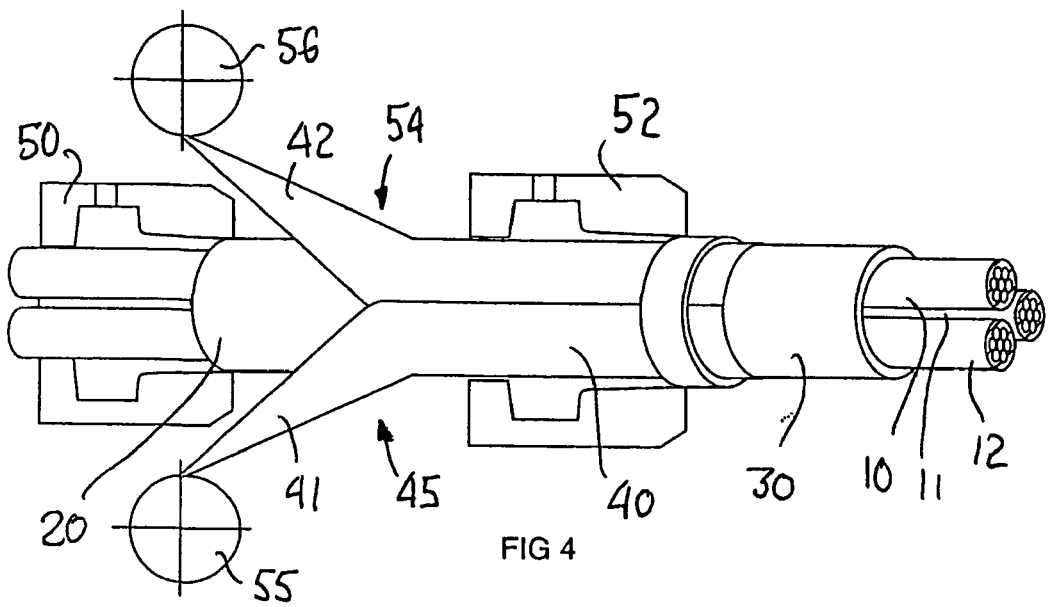
FIG. 4 is a perspective view of the cable's manufacture.

Referring to FIG. 4, the power lines 10, 11, 12 are threaded through as first extruder 50 and a second extruder 52.

Between the two extruders, the cable 45 passes through a sheet casing means 54. After having been threaded through the machines 50, 52, 54, it is convenient to apply a force is exerted on the power lines to pull them through the extruders.

The first extruder 50 extrudes plastic through the circular die through which the cables are threaded. The extruded plastic thus encases the power lines together within a plastic cylinder 20, the diameter of the die being wider than the largest diameter of the intertwined cables.

Two strips of impermeable sheet 41, 42 are unwound from spools 55, 56 positioned opposite sides of the plastic encased power lines. The metallic coating could also be wrapped in a single strip around the circumference in a continuos layer. The impermeable sheets are formed into substantially semi-circular shapes around the plastic encased power lines. The impermeable sheets are formed such that they overlap each other so as to completely encompass the circumference of the plastic cylinder 20 to form a casing. During forming the impermeable sheets are applied to the plastic cylinder in a close fitting arrangement; the impermeable sheets could, after being formed into a tube encompassing the plastic cylinder, be swaged to grip the plastic cylinder. Where the edges of the impermeable sheets overlap, one of the edges may have a lip formed upon it, so that the other sheet lies upon the lip, with its edge abutting the shoulder formed by the lip, so that outer surface of the impermeable casing, even at the joins between the impermeable sheets, is smooth with no appreciable portions being proud or any appreciable depression existing. The plastic cylinder may include a longitudinal groove in order to accommodate the lips of the impermeable casing. This may be achieved by including small protruding portions in the die's profile, or by applying the impermeable casing whilst the plastic material from the first extrusion is still in a malleable state. The impermeable layer is either glued or welded together to guarantee there complete seal integrity. It will be appreciated that this process is well suited to the incorporation of metallic and other similar materials into an extrusion process.

The impermeable cased power lines 45 are then pulled through the second extruder 52, the circular die of which has a larger diameter than the impermeable casing, such that an outer plastic layer 30 is applied over the outer surface of the impermeable casing 40. In this manner the armored cable shown in FIG. 3 is shown.

The process depicted in FIG. 4 is shown in a shortened, diagrammatic form for clarity. It should be noted, for example, that the first and second applications of extrudate are cooled sufficiently to be handled in the subsequent stages. Also, the cables are not here shown as intertwined.

Figure 5:
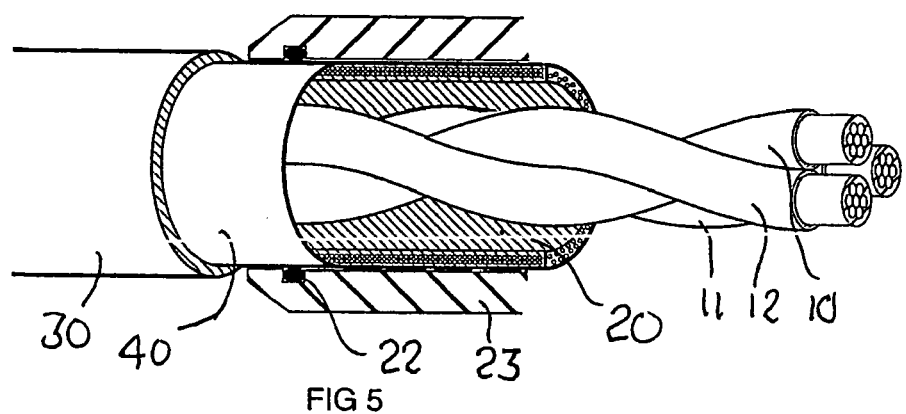
FIG. 5 is a partially cut-away perspective view of the cable in use.

Referring to FIG. 5, the plastic cylinder 20 and impermeable casing 40 in combination provide good protection against ingress of fluid and gas which damage the insulation material and could embrittle the copper of the power lines, and mechanical stress and strain upon the cable. The outer layer of plastic 30 provides further protection, in particular to the impermeable casing 40. Further and different outer layers may be added, preferably by an extrusion process, to offer further support, particularly strength enhancement of the cable, and further environmental protection, particularly of the metal layer, depending upon the intended use and environment the system. Where the cable terminates, the ends of the power lines 10, 11, 12 of course no longer encapsulated by the protective armor of the cable. The end of the cable is therefore sealed against the environment so that the power lines are not exposed. In order to produce a seal for the present cable, a circumferential strip of the outer plastic coating is removed to expose the impermeable casing. A seal, for example, an elastomeric o-ring 22 within a connector 23, is then formed against the impermeable casing 40. Such a seal is more effective and reliable than a similar seal formed using the outer plastic surface, as plastic is porous, and may have been abraded during the installation of the cable.

Figure 6:
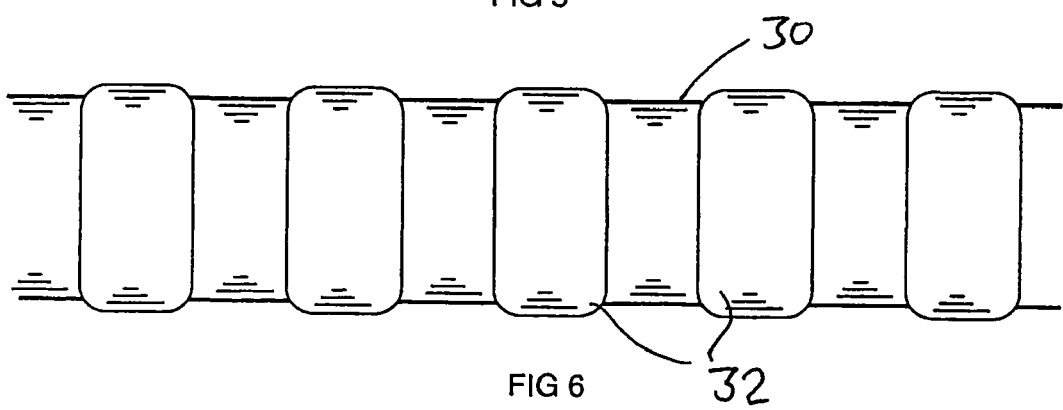
FIG. 6 is a side elevation of another embodiment of the cable in use.

The plastic coating also improves the handling qualities of the cable, it could have surface roughness added or profile changes to assist gripping. The ease with which the cable 45 may be gripped can be still further improved by applying a texture to the outer plastic surface 30. Referring to FIG. 6, the outer plastic layer is formed into a series of saddles 32 along the length of the cable 45. This may be achieved by imprinting the texture upon the outer plastic layer soon after the cable has emerged from the second extruder and the plastic is still malleable, and causing this texture to set.

Referring to FIG. 7, an alternative way of forming a impermeable casing 40 around the plastic cylinder 20 involves forming a single longitudinal groove 60 in the plastic cylinder. Referring to FIG. 8, into the groove 60 a rigid channel 64 is inserted, and a single sheet of impermeable material 43 is applied to the plastic cylinder 20. The impermeable sheet is formed into a tube 40, the sides of the sheet featuring lips 70, 71 that engage with the rigid channel 60. The impermeable sheet 40 may be applied in a state of circumferential tension, so that the lips 70, 71 engage securely with the rigid channel. The lips 70, 71 may be further secured by some crimping or other deformation process within the rigid channel 64. The impermeable sheet 43 is coated upon the surface which is to rest upon the plastic cylinder with an adhesive compound 32 to further secure it. This coating may also form an additional protective barrier for the power lines 10, 11, 12.

Figure 10:
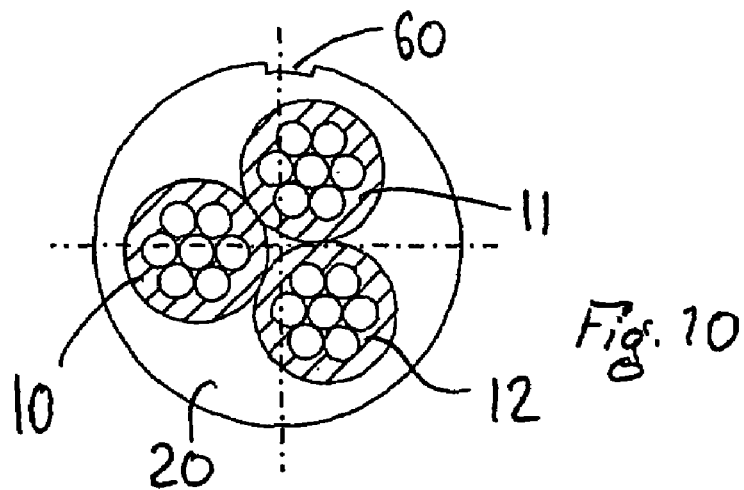
FIGS. 10 to 12 are cross sectional views of the manufacture of another embodiment of the cable.
Figure 11:
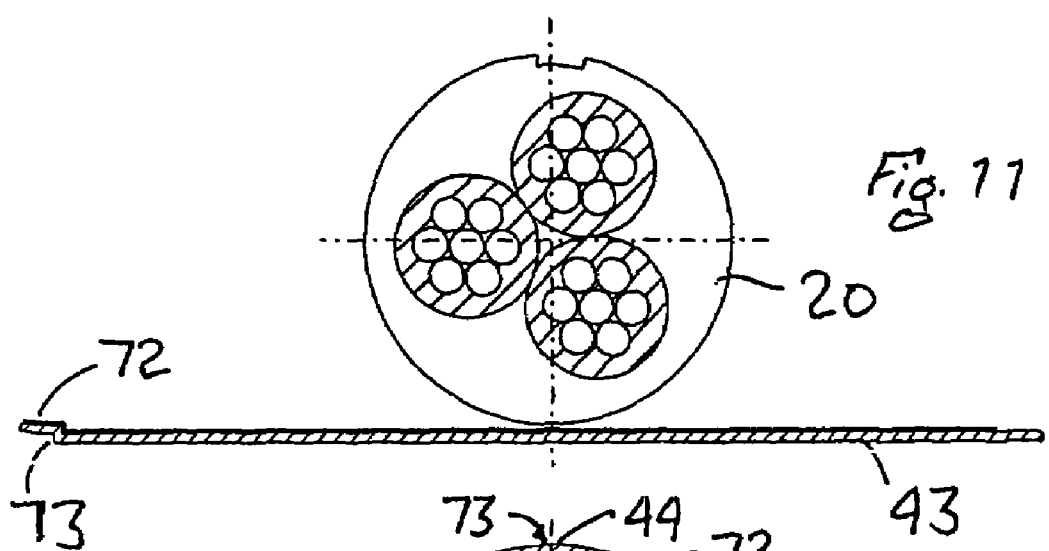
Figure 12:
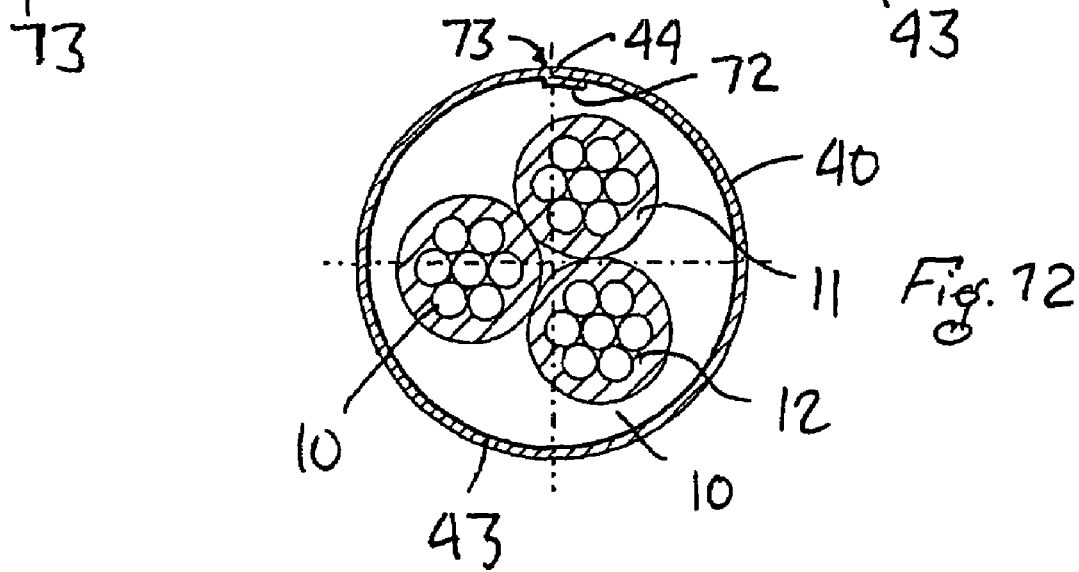

Referring to FIG. 10, a single impermeable sheet 43 having a shouldered lip 72 may be applied to the plastic cylinder 20, the plastic cylinder having a longitudinal groove 60 corresponding to the sheet's lip 72. The impermeable sheet is then formed into a tube, with the edge of the sheet opposite the lipped edge abutting against the lip's shoulder 73, as shown in FIG. 10.

It will be noted in all of the embodiments, the seam or seams of the impermeable sheet lies flush with the surface of the casing 40, so that when outer plastic layer 30 is stripped, a good seal may be formed around the circumference of the impermeable casing 40.

Figure 13:
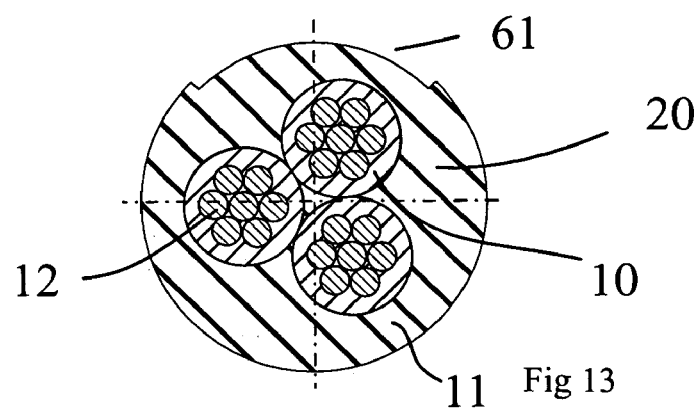
FIGS. 13 to 16 are cross sectional views of the manufacture of another embodiment of the cable.
Figure 14:
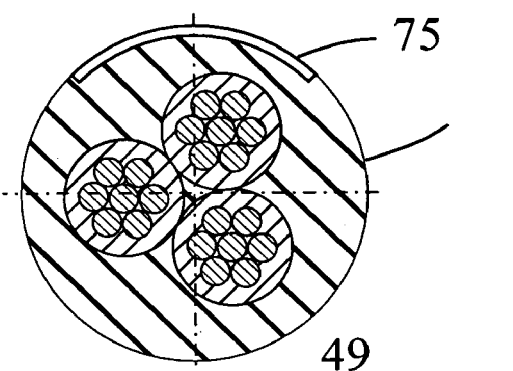

Referring to FIGS. 13 and 14, a relatively wide longitudinal groove 61 is formed on the plastic cylinder 20. Into this groove 61 is inserted a strip of heat shielding material 75. This could, for example, be a strip of ceramic material with a cross section having a similar curvature to that of the circumference of the plastic cylinder, or a strip of flexible heat shielding material such as asbestos cloth or some equivalent which adopts the required curvature.

Figure 15:
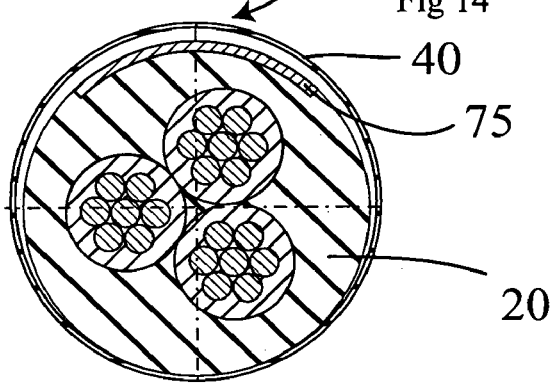

Referring to FIG. 15, a sheet of impermeable material is applied encompassing the plastic cylinder in a tube 40. The seam of the sheet 49 where the sheet's two edges meet are welded or brazed together, the heat shielding material 75 protecting the power lines 10, 11, 12 and the plastic material of the cylinder 20. It will be appreciated that the width and thickness 10 of the heat shielded material 75, and the corresponding dimensions of the groove 61, are dependent upon the nature of the welding.

Figure 16:
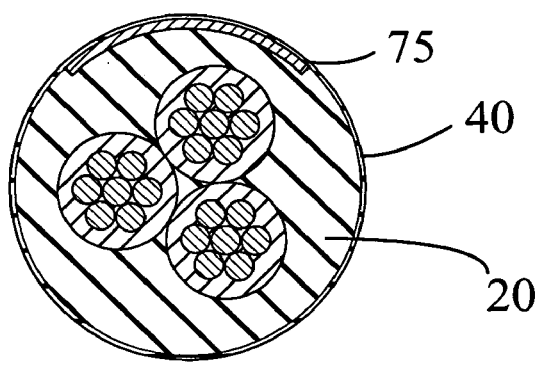
Figure 22:
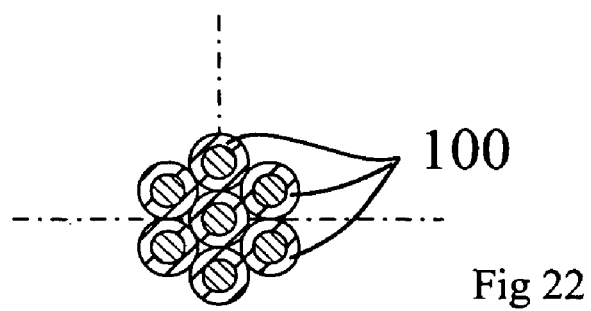
Figure 23:
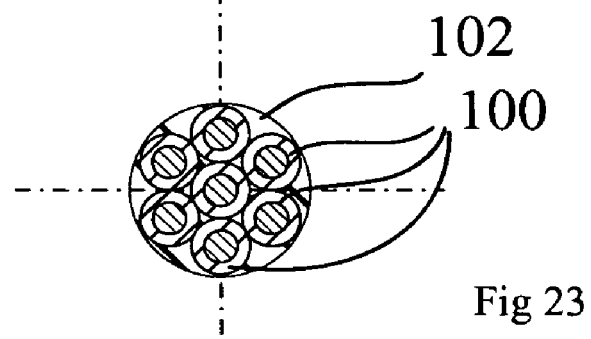
Figure 24:
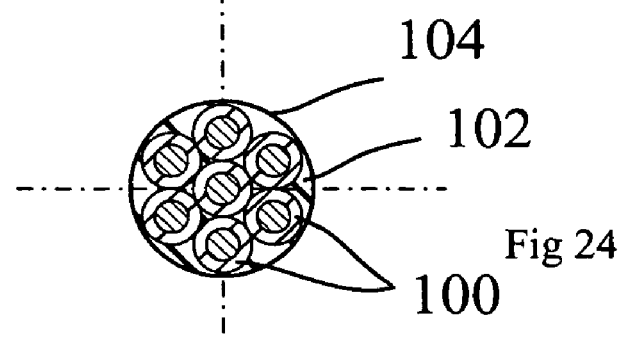
Figure 25:
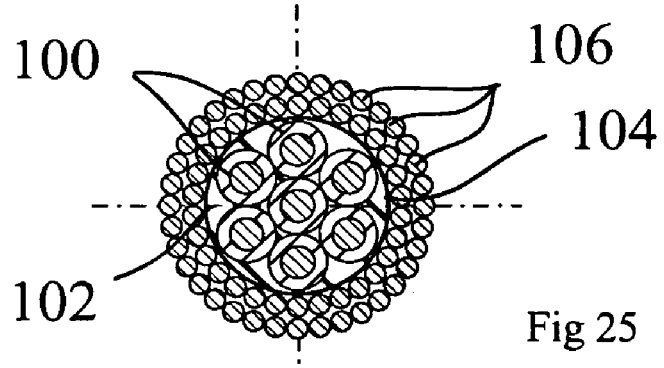

Referring to FIG. 16, the impermeable casing 40 is swaged so that it firmly grips the plastic cylinder 20. This typically results in a slight thickening of the wall of the casing 40, and a slight lengthening of the casing. The unswaged portion of the impermeable casing moves relative to the plastic cylinder 20 in order to accommodate this lengthening. The length of impermeable sheet applied will thus be somewhat shorter than the plastic cylinder to which it is applied.

Referring to FIG. 17, a plastic tube 80 is extruded, though of course it may be otherwise formed. A layer of aluminum 82 is wrapped or applied in a sheet to the plastic tube, entirely encompassing it, as shown in FIG. 15. The layer may be formed also in similar ways to that described for the impermeable sheet above. The aluminum-wrapped tube is then fed through a second extruder, to produce a second plastic layer 90 featuring cut away sections 90, 91 shown in FIG. 19. These cut-away sections result from the profile of the extrusion die (although these cut-away sections are advantageous they are not essential in the manufacturing process). The extrusions include three relative wide grooves 90 into which (referring to FIG. 20) three strips of copper conductor 93 are respectively inserted. The extrusions also include three small channels 91 into which three lengths of fiber optic cable 94 are respectively introduced. Referring to FIG. 21, after the copper conductors 93 and fiber optic cables 94 have been applied, the assembly is fed through a further extruder and a final layer of plastic 86 is applied. Having a through bore, such a conduit 46 could be used to convey hydraulic fluid, or even for the transport of oil. Cables could, if desired be introduced into the conduit 46. Rather than fiber optic cables 94, hydraulic cables or some other lines could be introduced. Naturally, the number and configuration of inserted elements could be varied.

The layer of aluminum 82 protects the conductors 90 and fiber optic cables 94 from the fluid conveyed in the conduit 46. Other metals and alloys could be substituted for the aluminum, particular, as for the previous embodiments, mild steel or carbon steel.

Referring to FIGS. 22 to 25 a seven-strand conductor 100 (known as "hepta cable") may be treated in a similar way. The hepta cable is coated in plastic 102 by extrusion to form a cylinder, and this cylinder is wrapped in an aluminum coating 104 in the manner previously described. The aluminum coating 104 is then wrapped (in a braided manner) in a torque-balanced braided wireline 106. This wireline 106 armors the cable, and allows the cable to withstand tension, the wireline may be made any tough material; steel would be a suitable material.

Referring to FIGS. 26 to 30, in a further embodiment hepta cable 100 has been plastic coated 102 and wrapped with torque balanced braided wireline 106; cables wrapped in such torque balanced braided wireline are commercially available. From the outer layer of braided wireline 106, alternate braids are removed. The resulting cabling is then extruded so that the braided wireline is coated in plastic 110 to form a cylindrical shape. The removal of some of the braids 106 results in a more highly creviced surface which ensures that the plastic 110 is firmly keyed to the braided wireline 106. The plastic layer 110 is then covered by an aluminum barrier 112 using the previously described methods. An outer plastic layer 114 may then be applied upon the aluminum layer 112 for handling purposes, also as previously described.

Figure 31:
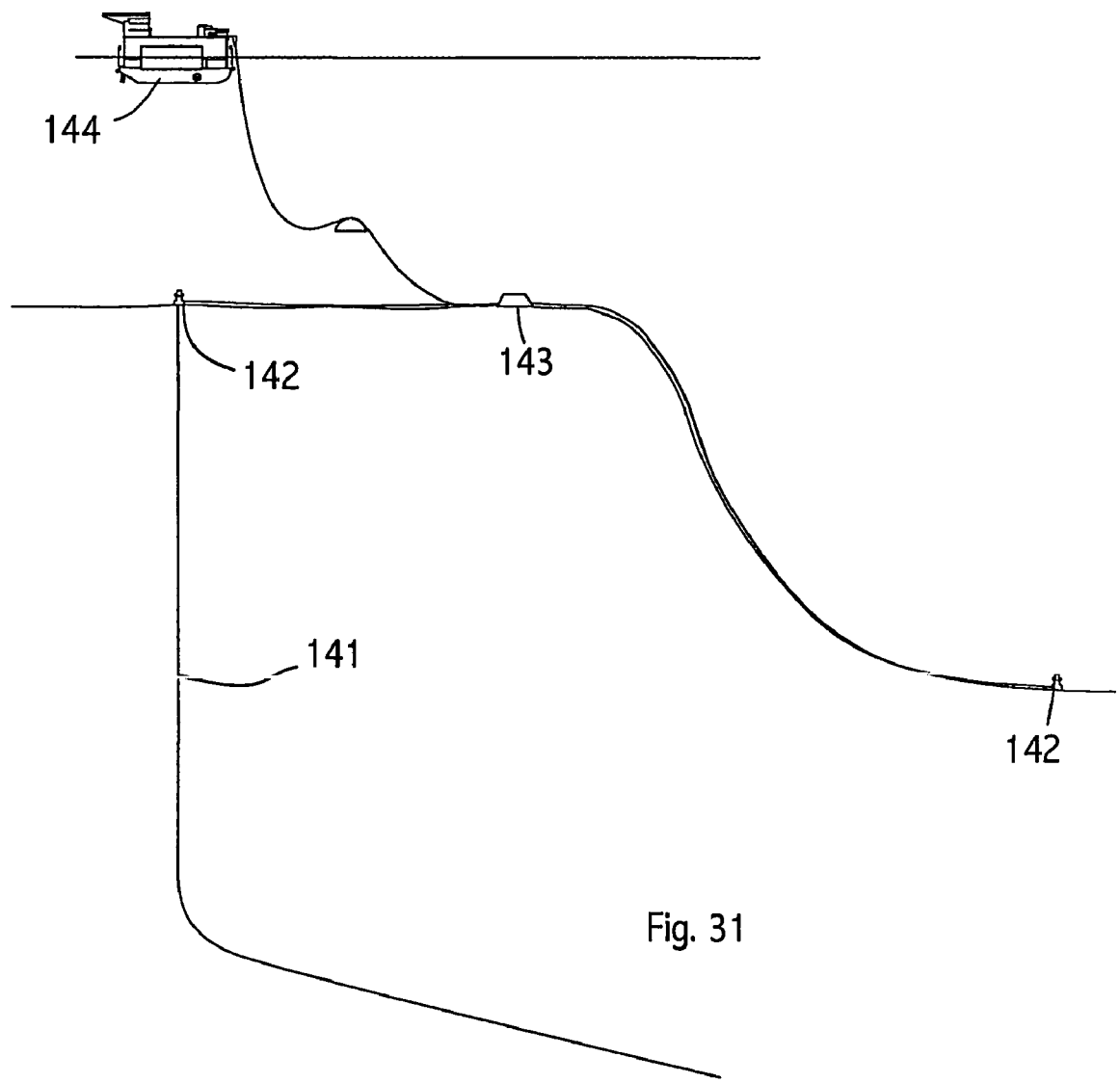
FIG. 31 is a view of the system in use.

Referring to FIG. 31, the protected tube may be installed in a well bore 141, or could be used to convey oil from a well head 142 to a central connection node 143 or to a floating vessel 144 or the like.

Referring to FIG. 32, the protected tube may be installed in a riser or a well casing, and either secured by swaging internally, or left to hang from a cable and cable head unit. The cable head unit includes apertures suitable for allowing oil to flow through the through bore of the tube. The cable allows supply of power to the power strips. Equally, power could be supplied from a 'stab in' assembly, shown in FIG. 33, with power coming from a subsea facility.

The aluminum layer protects the heating strip, power lines and sensors from corrosion. As in the previous embodiments, the aluminum layer also minimizes the risk of gas permeating the structure of the tube to lead to explosive decompression.

It will be appreciated that particular features described in one embodiment may be transposed with equivalent features used in other embodiments. For example, any of the methods of securing the impermeable sheet may be applied to the conduit. Further, features from different embodiments may be used in combination, for example, fiber optic lines could be added in an additional step when producing the plastic encased power lines shown in FIGS. 13 to 16.

It will also be appreciated that other material and components could be used with equivalent effect. For instance, metals other than steel could be used to cover the plastic cylinder, and other metals apart from aluminium can be 20 used to cover the plastic tube. Naturally, other numbers of power lines, or indeed other types of line, could be armoured in the way described.

Figure 34:
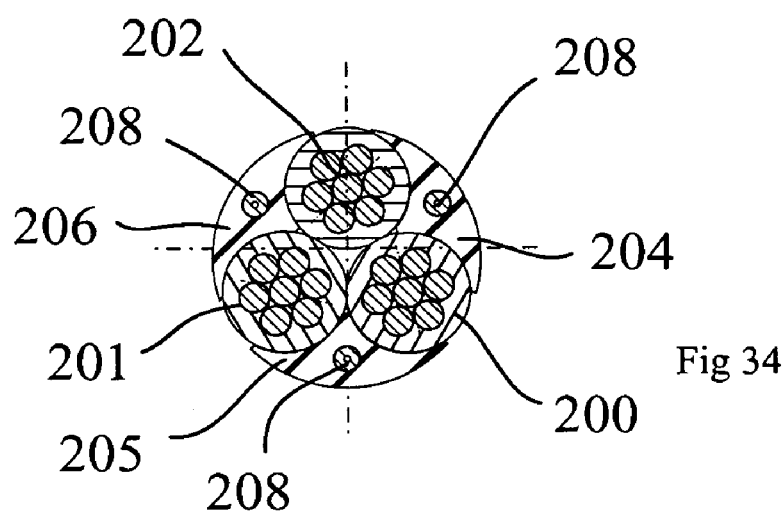
FIGS. 34 to 37 and 42 show cross sectional views of the manufacture of a further embodiment of the cable.

Referring to FIG. 34, another embodiment of the protected cable includes three conductive lines 200, 201, 202, each comprising seven wire strands of conductor in a packed formation surrounded by insulation and known as 'heptacable'. Three shaped segments 204, 205, 206 are produced by extrusion, each segment having a convex curved surface and two concave curved surfaces, so that the three segments 204, 205, 206 interlock with the three conductive lines 200, 201, 202 as shown to produce a closely-fitting flush circular circumference in section. Each shaped segment includes a telemetry cable 208 (for example, fiber optic or electrical cable), this being co-extruded with the shaped segment, and helps the segment maintain its shape upon extrusion.

Figure 35:
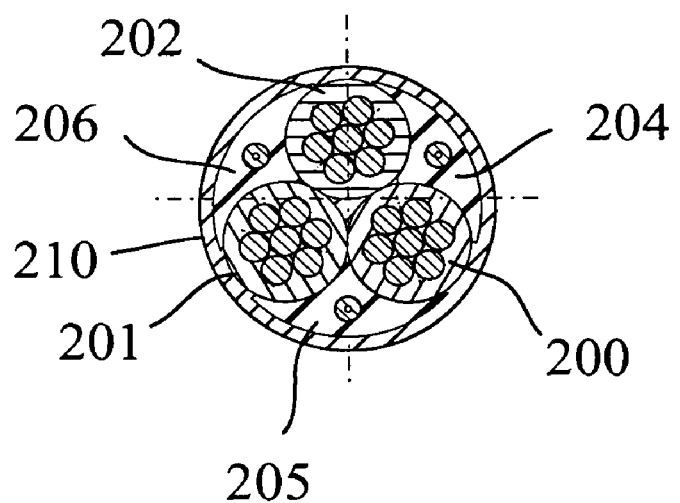

Referring to FIG. 35, the conductive lines 200, 201, 202 and shaped 10 segments 204, 205, 206 are secured together using a plastic or rubber extrusion 210, which fills any voids between the conductive lines and shaped segments, and provides a smooth round outer circumference.

Figure 36:
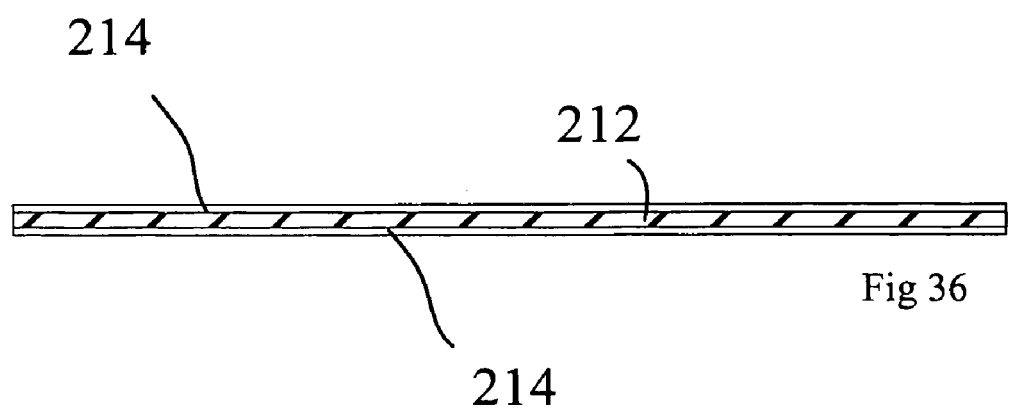
Figure 37:
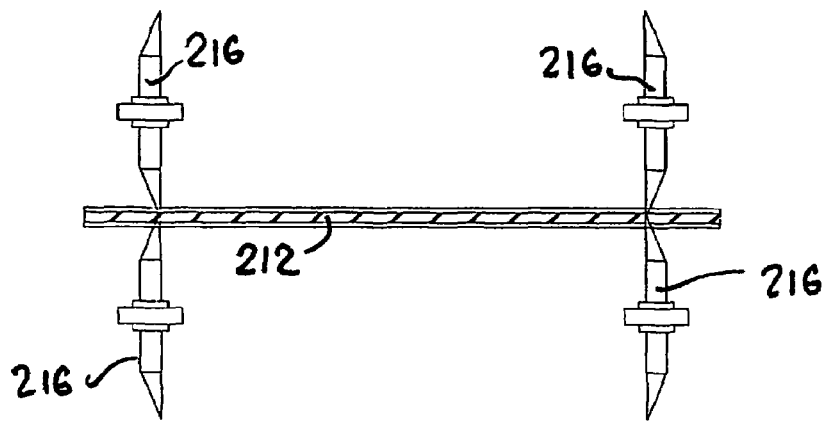

Referring to FIGS. 36 and 37, a continuous sheet of mild steel or carbon steel 212 (typically about 0.1 to 0.15 mm thick) has a plastic coating 214 (typically about 0.01 to 0.03 thick) on both sides to prevent the steel from oxidising or corroding in harsh environments in which the protected cable is to be placed. The steel is then slit by cutting discs 216 to the correct width prior to being applied to the cables.

Figure 38:
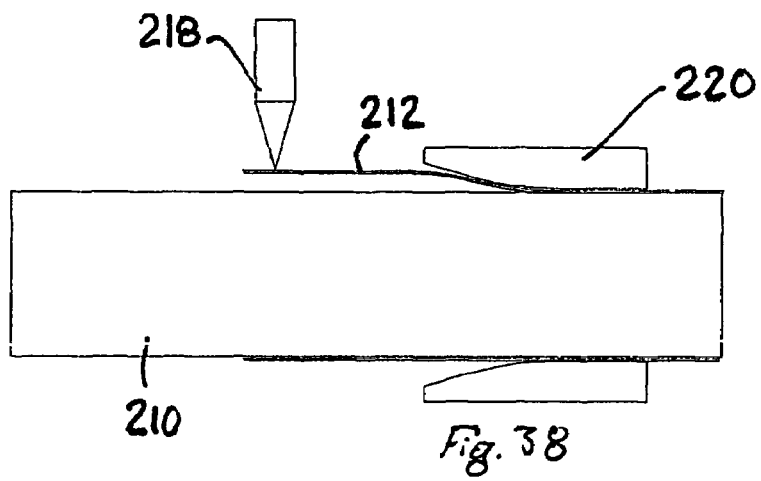
FIGS. 38, 39 and 43 show side views of the manufacture of this embodiment 20 of the cable.
Figure 39:
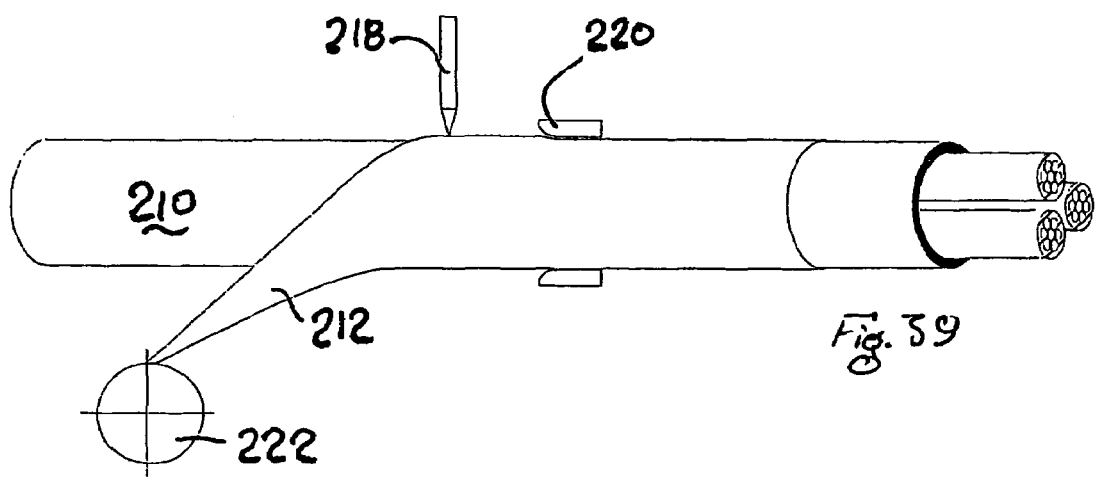
Figure 40:
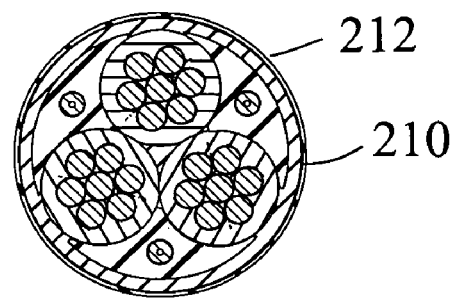
FIG. 40 shows a cross sectional view of this embodiment of the partially manufactured cable.

The steel sheet 21 is fed from a reel 222 and wrapped around the plastic coating 210 of the cable lines and shaped segments, and the edges of the steel sheet are joined at a welding station, using a TIG or a laser welder 218 for example, as shown in FIGS. 38 and 39. The plastic coating of the steel vaporizes along the welded edges. The diameter of the steel tubing formed by the application of the steel sheet is about 5% larger than the diameter of the outer surface of the plastic extruded layer 210 that it is being applied to, so that a volume exists between the plastic extrusion and the steel. The steel is positioned so that the gap is maximized along the steel edges being welded. This avoids significant damage to the plastic layer by the welding heat. The steel tube is then secured to the extruded plastic layer by swaging the steel tube by a die 220, as shown in FIGS. 38 and 39, to give a close fitting layer of steel 212 around the rubber extrusion 210, as shown in FIG. 40.

Figure 41:
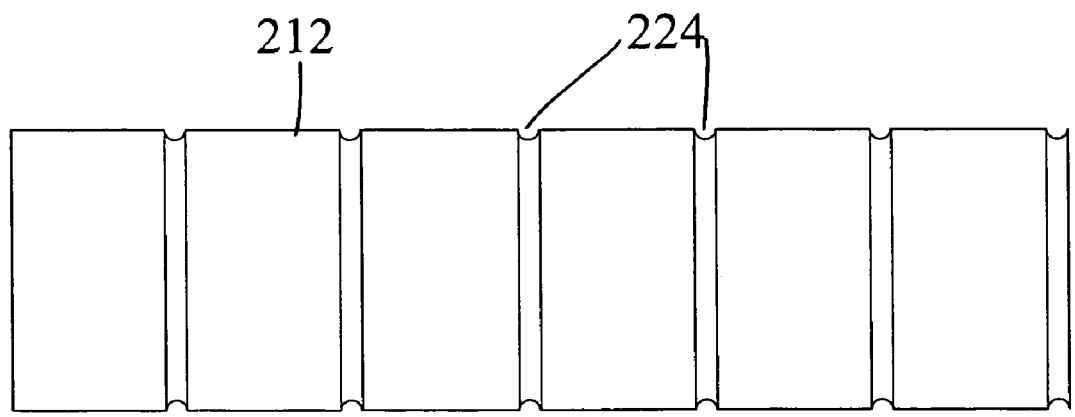
Figure 42:
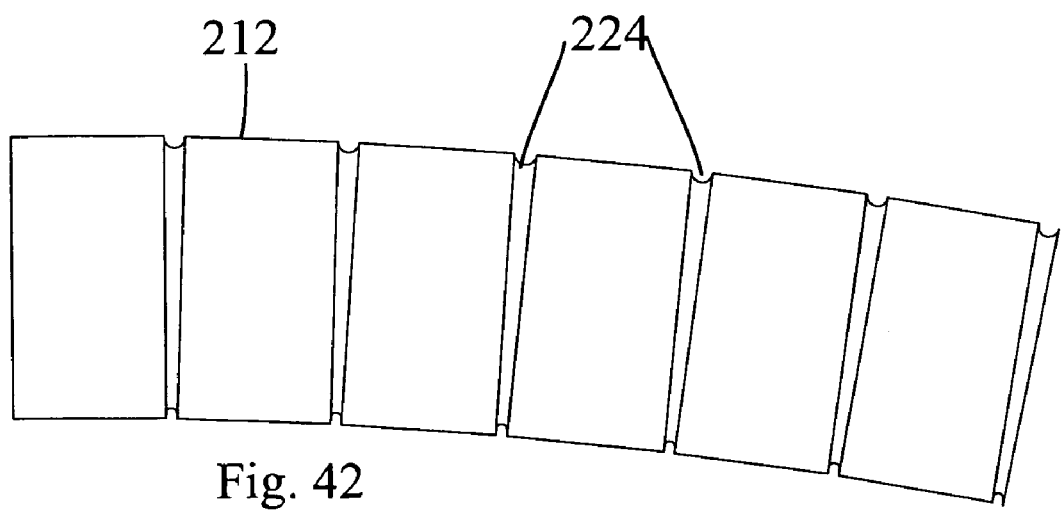

Referring to FIG. 41, during swaging, or as a separate process, annular grooves 224 are impressed at regular intervals along the surface of the steel barrier layer 212. These grooves 224 increase the flexibility of the steel along its length as shown in FIG. 42, whilst a sufficiently large area having a constant circumference remains between the grooves to allow an seal to be conveniently made around the steel layer 212.

Figure 43:
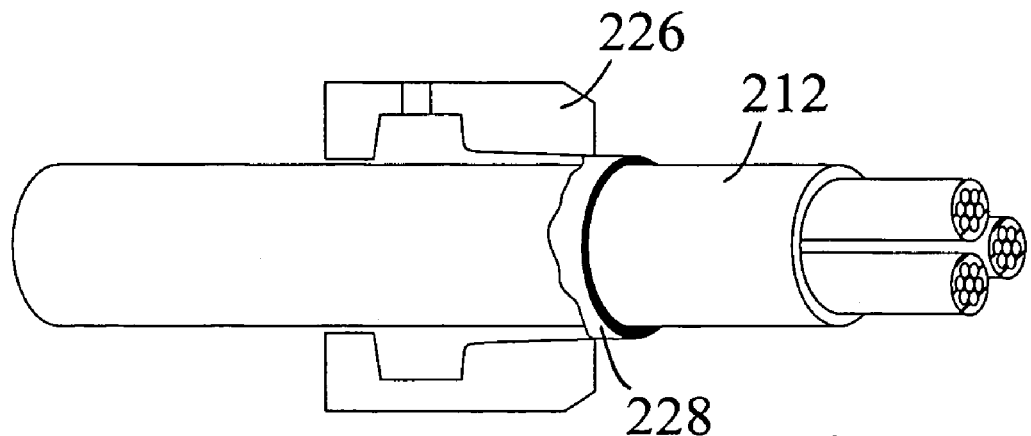
Figure 44:
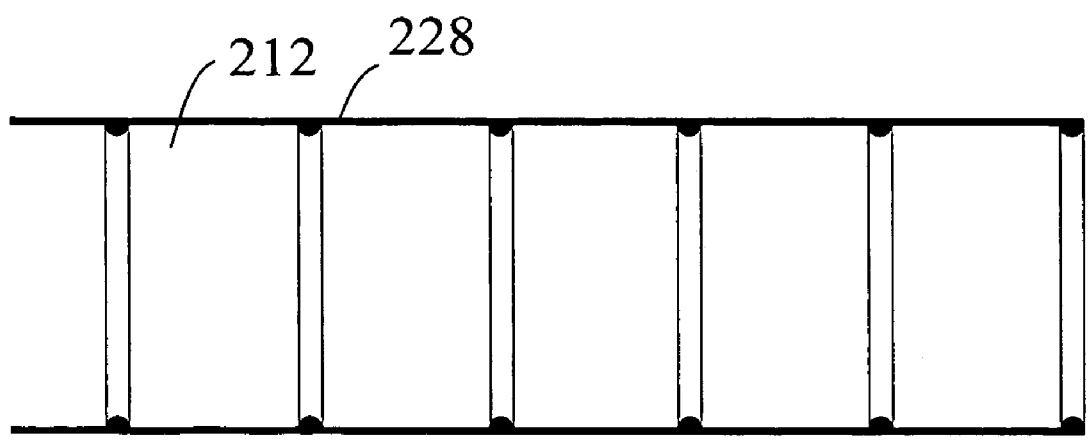
FIG. 44 shows a partially exposed view of this embodiment of the fully manufactured cable.
Figure 45:
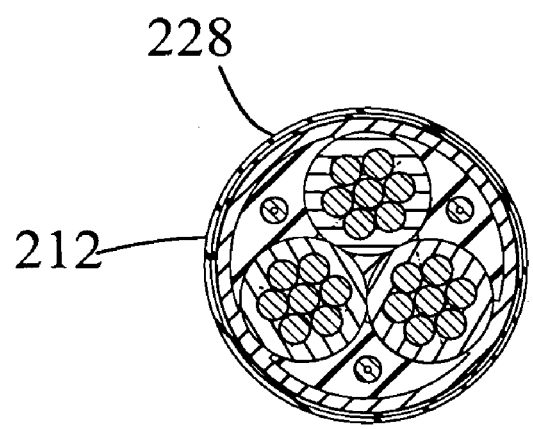
FIG. 45 shows a cross sectional view of this embodiment of the fully manufactured cable.

Referring to FIG. 43, a layer of plastic 228 is applied by an extrusion station 226 over the steel barrier layer 212, as shown in FIGS. 44 and 45. The outer plastic layer 228 is applied to the steel barrier layer 212 at peel bonding strength so that it may be easily removed.

Figure 46:
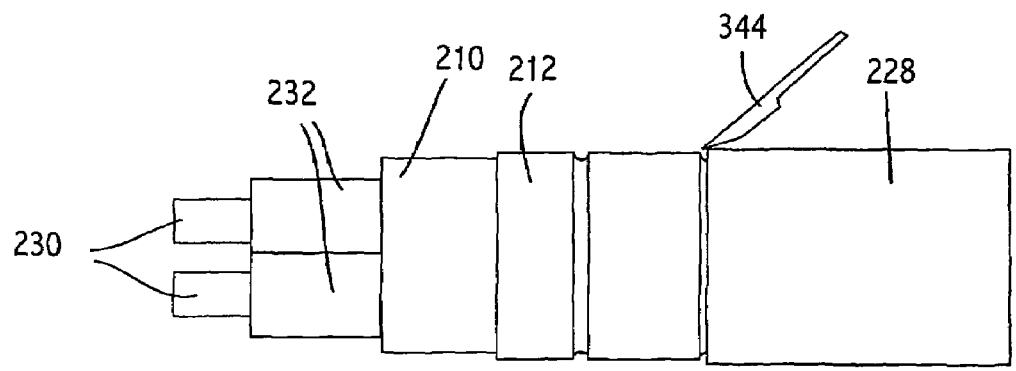
FIGS. 46 to 50 show side and sectional views of the treatment of the end of this embodiment of the cable.
Figure 47:
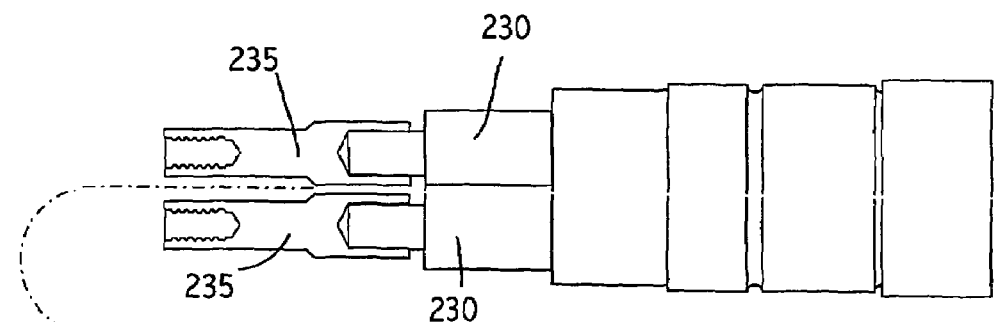

In order to attach the cable to the power supply or the apparatus to be powered, the conductor 230, conductor insulation 232 (together making up the conductor lines 200, 201, 202), the plastic layer 210, the steel barrier layer 212, and outer plastic layer 228 sequentially exposed by cutting means 234 as shown in FIG. 46. Referring to FIG. 47, the exposed ends of the conductors 230 are introduced into end terminations 235, which are crimped or soldered onto the exposed conductor as shown. Each of these end terminations includes a threaded bore facing the conductors.

Figure 48:
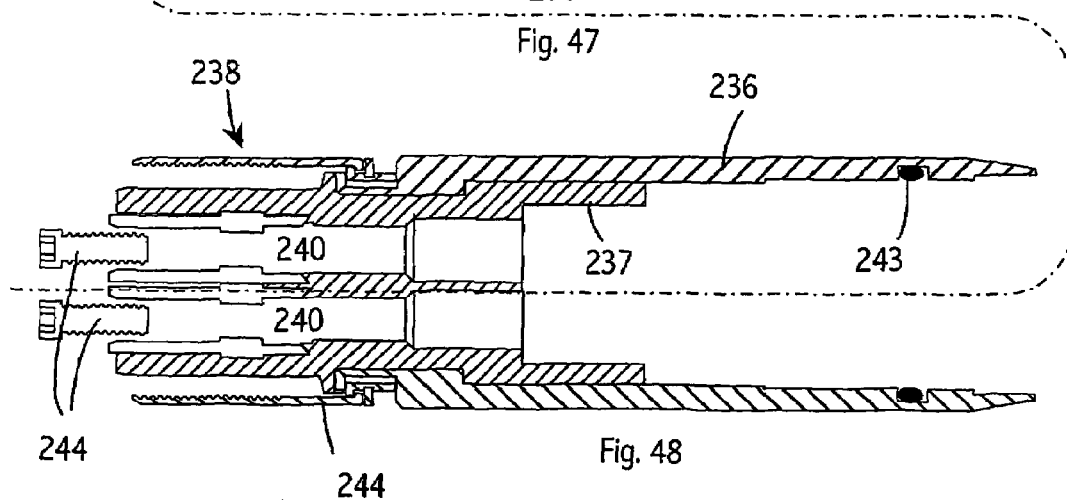
Figure 49:
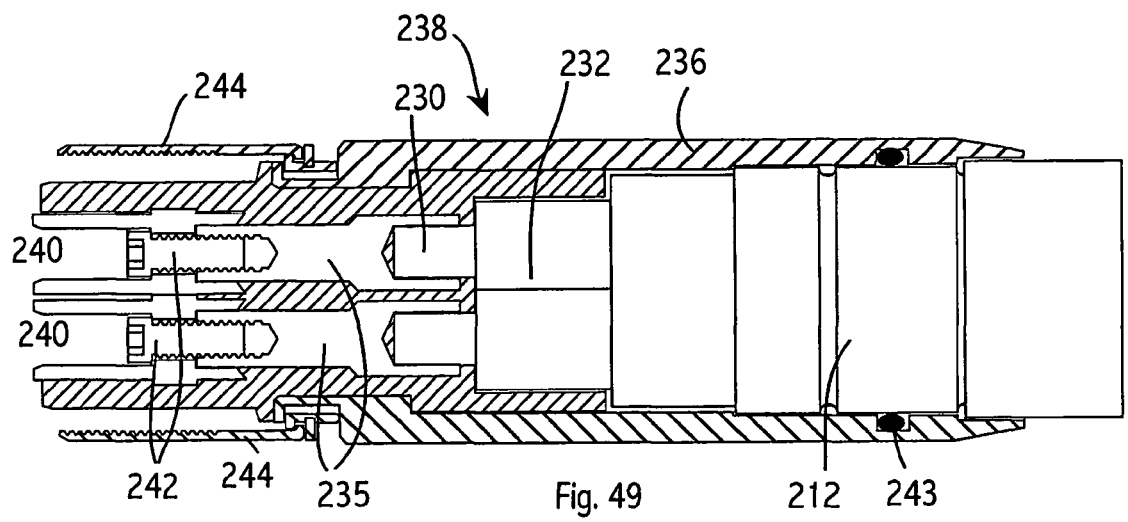
Figure 50:
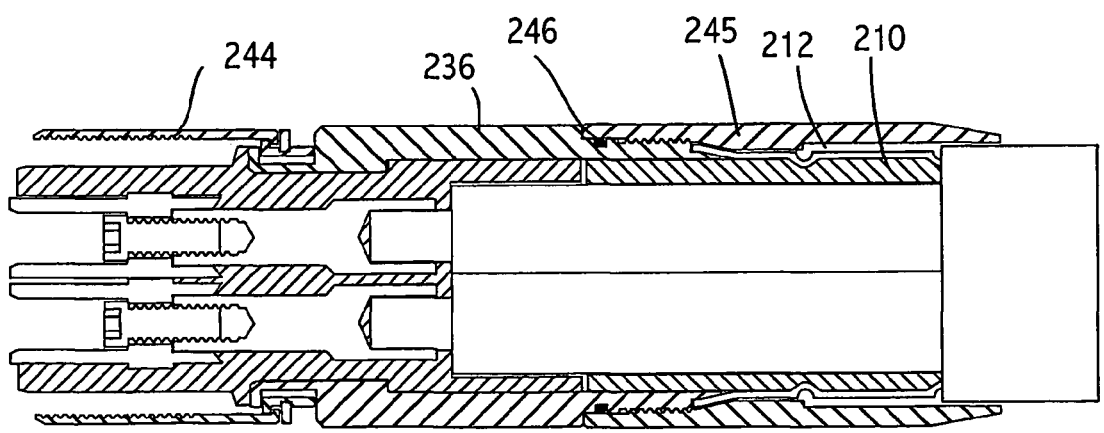
Figure 57:
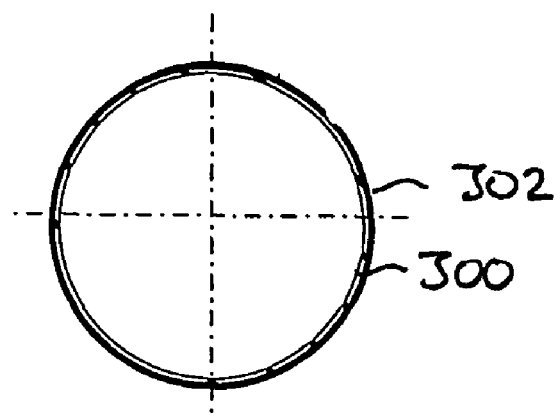
FIGS. 57 to 60 show sectional views of the manufacture of another embodiment of the protected cable.

Referring to FIG. 48, a cable termination assembly 238 comprises an outer metal sheath 236 and inner mating surfaces 237. The end of the protected cable (stripped and prepared as shown in FIG. 47), is introduced into the cable termination assembly 238, the outer metal sheath 237 extending over the metal barrier layer 212 of the cable, and the inner mating surfaces 237 bearing against each of the exposed layers of the cable. Three bores 240 (only two of which are here visible) aligned with the end terminations extend through the cable termination assembly. Screws 242 are inserted through these bores to engage with the end terminations, the screw heads engaging the cable termination assembly to lock the cable into place, as shown in FIG. 50. The assembly is sealed by an o-ring 243 between the outer metal sheath and the exposed metal barrier layer. Part of the bore through which the screws are inserted then serve as female pins for the electrical connection. A rearward facing retaining nut 244 has a threaded Omer surface for securement to a corresponding outer threaded surface of the assembly that the cable is being connected to.

An alternative joining configuration is shown in FIG. 50, where the outer metal sheath 236 includes an outer threaded surface. A connection sleeve 245, having an inner threaded surface corresponding to that of the outer sheath 236 is placed on the end of the cable before the cable termination assembly 238 is attached. The end of the metal barrier layer 212 is deformed away from the underlying plastic layer to form a circumferential skirt portion. The cable termination assembly is then threaded onto the cable and the outer threaded surface edge of the metal sheath 236 of the cable termination assembly 238 extends beneath this skirt, whilst the connection sleeve 245 lies above it. As the connection sleeve 245 is screwed to the outer metal sheath 236, the flared end portion of the steel barrier layer 212 is caught and tightly gripped between the connection sleeve and the outer metal sheath, forming a metal to metal seal. An o-ring 246 may be included to supplement this metal to metal seal.

Two similar lengths of protected cable could be joined in order to produce a greater length. Referring to FIG. 51, the two ends of cable 250, 251 to be joined have their layers stripped and dressed back to expose the conductors 230 as shown. Corresponding engaging connection sleeves 252, 253 (one sleeve 252 having a female thread and the other 253 a corresponding 15 male thread) are placed on each cable end 250, 251. One cable end 250 has the insulating layer of its conductors stripped to expose a greater length of insulating cable 232 than the other cable end 251, and an insulating sleeve 255 is placed on this portion of cable insulation 232. The exposed corresponding conductors 230 of each cable end are then joined by being crimped or soldered to common connectors 233. Referring to FIGS. 52 and 53, to join the two cable ends 250, 251, the insulation sleeve 255 is slid along the cable until the insulation sleeve covers the conductor ends 230 and the connectors 233, and then it is secured. The connection sleeves 252, 253 are brought against each other, and then securely screwed together, an o-ring 257 sealing the screw threads. The position of each connection sleeve relative to its cable may be secured using a set screw or dowel pin 258 between one of the annular grooves on the metal barrier 212 of the cables and an annular groove on the internal surface of the connection sleeve. O-rings 246, 256 mounted on the internal surfaces of the connection sleeves 252, 253 seal the connection sleeves with the steel layers 212 of the protected cables 250, 251.

Referring to FIGS. 54 to 56, the connection sleeves 252, 253 may include each be provided with a male thread 261, 263 upon the end of the connection sleeve furthest from the spliced region of the cable. Securement collars 260, 262 include a corresponding female thread which engages with the respective connection sleeves 252, 253. Each engaging connection sleeve and collar (252 and 260, and 253 and 261, respectively) include a ramped abutting surfaces 271, 272 beyond the engaging threads. When the two connection sleeves 252, 253 have been threaded and locked using set screws or dowel pins, together as previously described, these securement collars are tightened, so that the ends of the connection collars are pressed radially inwards to ensure that the o-rings 256, 246 seal properly with the exposed metal surfaces 212 of the cable ends 250, 251.

Figure 58:
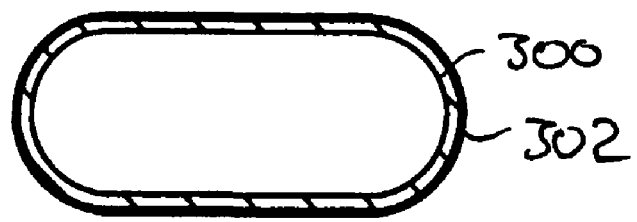
Figure 59:
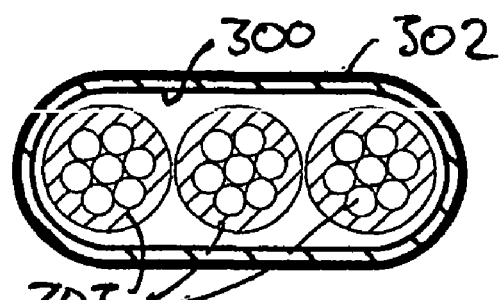
Figure 60:
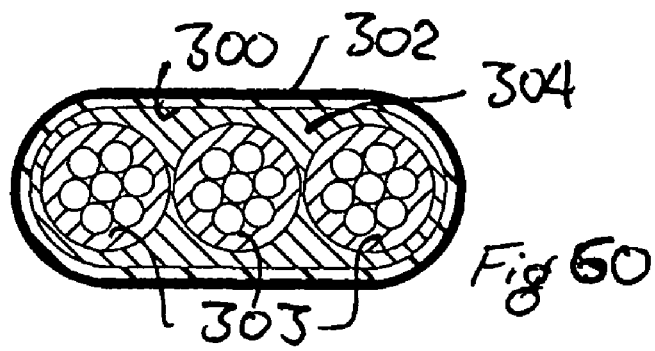

Referring to FIGS. 57 to 60, in an alternative manner of forming the protected cable, an outer layer of plastic 302 is extruded over a tube of carbon steel 300. As in previous embodiments, this outer layer may be bonded so as to be easily peelable. The plastic coated tube is then deformed, as shown in FIG. 58, to a flattened shape, and conductive cabling (such as three encapsulated hepta cables 303) is slid in, as shown in FIG. 59. When the conductive cabling 303 has been installed, the cabling is potted by pumping in a silicone two part compound 304 which sets to secure the cabling 303 in the plastic coated metal tube 300, 302. The cross section of this form of protected cable allows the cable to be introduced into volumes in which clearance in one direction may be restricted, for example if the cable is to be installed down a drill string past a motor or some other tool, suspended part way along the drill string. The plastic coated tube may be deformed from the circular to other shapes such a curved, kidney bean shaped section, depending upon the intended use and clearances which are necessary.

Figure 61:
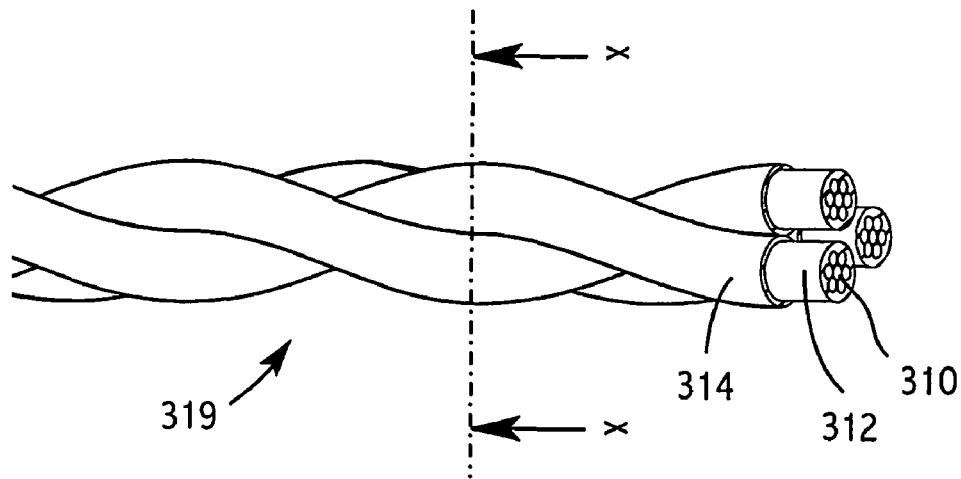
FIGS. 61, 62 and 64 show perspective and sectional views of another embodiment of the protected cable.
Figures 62, 63:
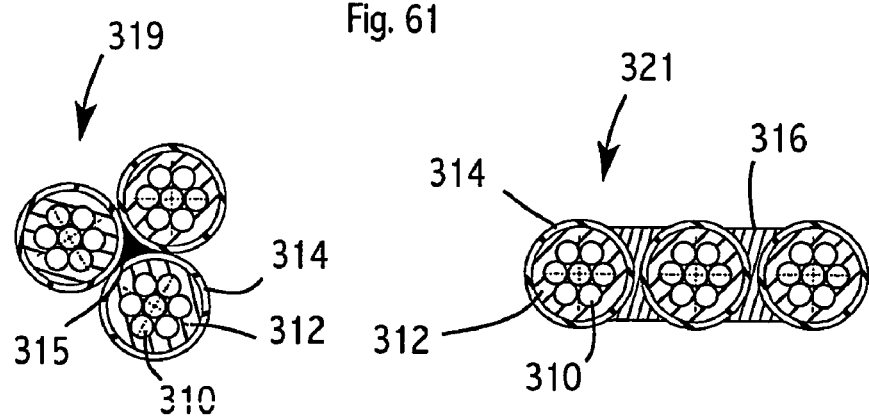
FIGS. 63 and 65 show sectional views of another embodiment of the protected cable.
Figure 64:
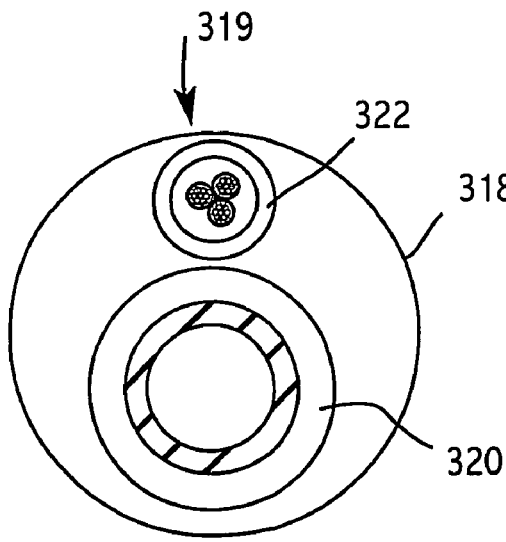
Figure 65:
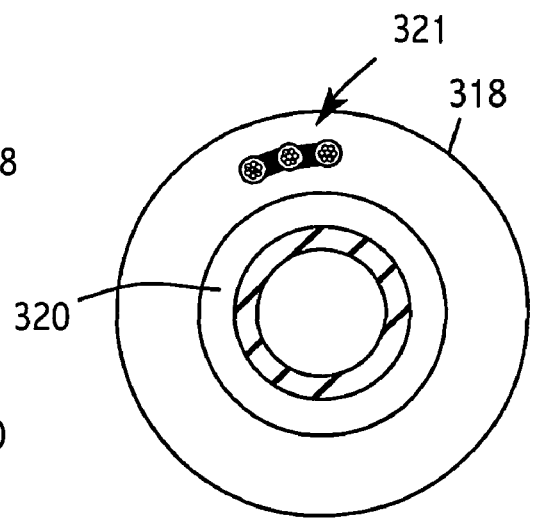

Referring to FIGS. 61 and 62, individual bundles 310 of seven wire cable may be extruded in a tube 312 of circular section, to be cased in a protective thin metal barrier 314. Three such protective cables may then be braided in a twisted manner and then bonded (for example using a further plastic or rubber extrusion 315 between a triangular formation of the cables) to form a conductive cable means 319. Such twisting avoids impedance that may be induced in such cables, since the impedance in one of cables in one region of the cable configuration will be balanced by the impedance in that cable at another region. These cables may then be installed in continuous tubing 322, or further coated to add extra layers using extrusion process described above to produce a tubular structure. Such a protected electrical cable structure may be installed with a well head or packer in a well as shown in FIG. 64, the wellhead 320 being located displaced from the central axis of the well 318 in order to accommodate the protected cable. Alternatively, individually extruded and metal coated seven wire conductors could be grouped in a linear fashion 321, as shown in FIG. 63, bonded together using an adhesive 316, for example an extruded plastic layer. Using individually metal coated conductors avoids some difficulties that may be encountered when wrapping a metal coating around linearly arranged conductors described in a previous embodiment, such as protecting against hot spots and sealing problems when applying the metal coating. Such a relatively flat arrangement may be installed in a smaller annulus than say a triangular arrangement, and the well head 320, or packer or similar may be kept located centrally, as shown in FIG. 65.

Figure 66:
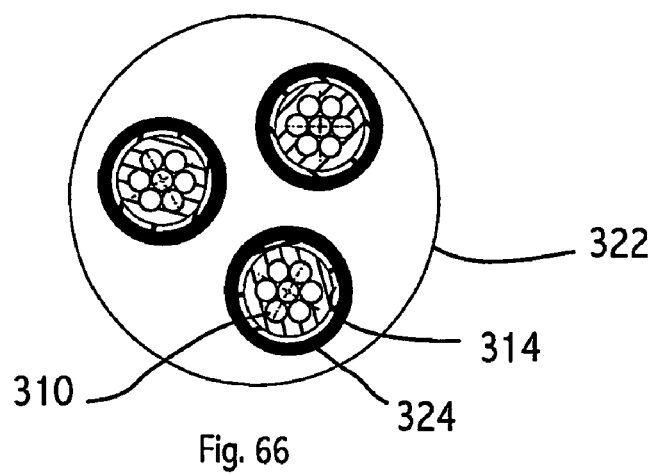
FIG. 66 shows a cross sectional view of another embodiment of the protected cable.
Figure 67:
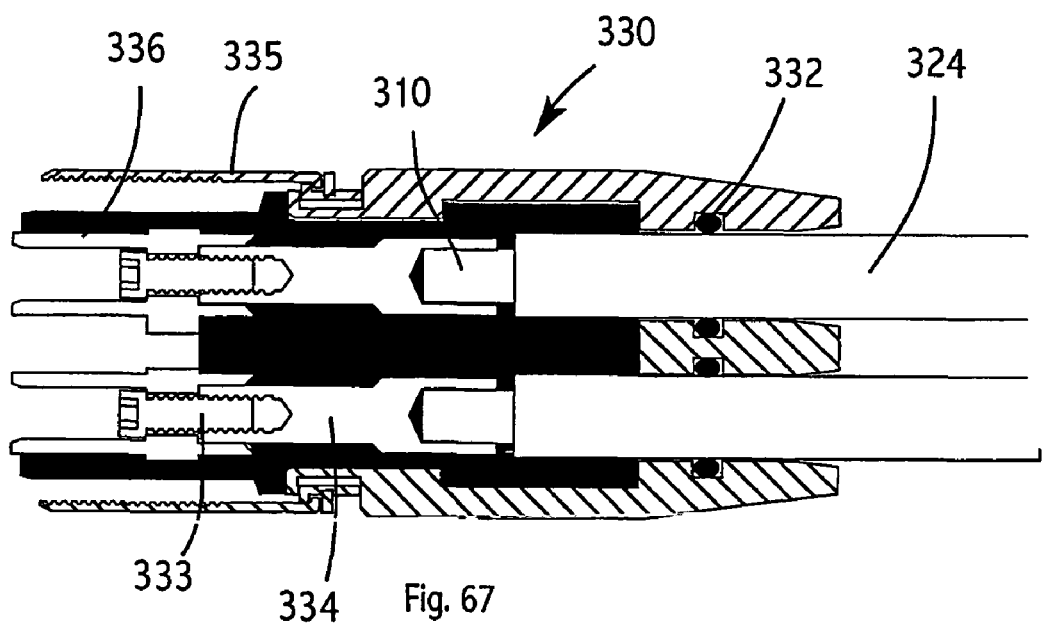
FIG. 67 shows the termination of this cable.
Figure 68:
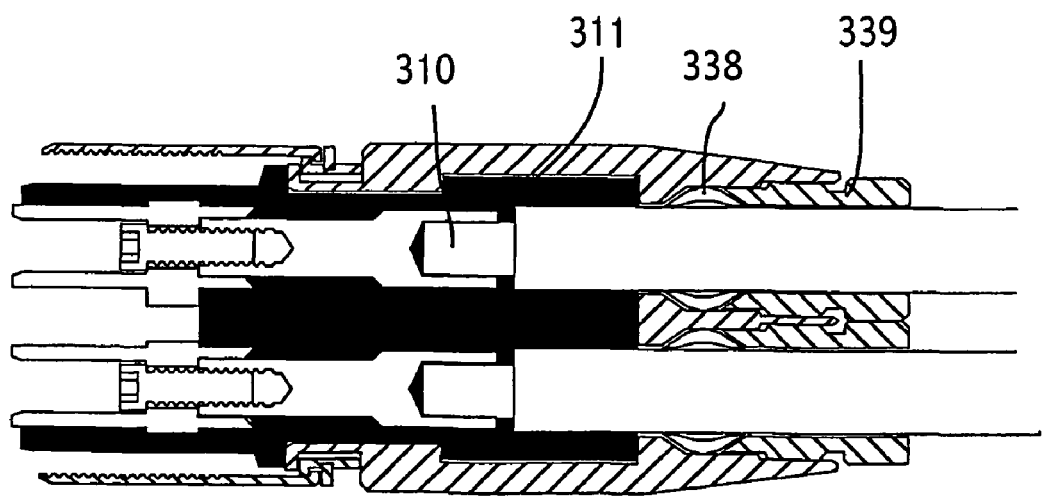
FIG. 68 shows the termination of another embodiment of this cable.

As previously, metal layer of the cables may have a further, layer 324 extruded over it, as shown in FIG. 66. Referring also to FIG. 67, to connect the cables shown in FIG. 61 to equipment to be powered, the three metal protected cables are slightly separated at the end of the cable structure, and a portion of the metal casing 314 and plastic extrudate 324 removed to expose the wire conductors 310. Each protected cable is then introduced into a receiving bore of a termination assembly, where the metal layer is sealed by a rubber o-ring 332. The wire contacts are then electrically connected to a female pin 336 via a solder or crimp 334, the female pin being secured by an engaging screw 333. The termination assembly 335 includes a retaining nut at its outer circumference, whose inner surface is threaded to receive the portion of the equipment that is to be powered. On attaching the equipment to the retaining nut, the seal between the retaining nut and the rest of the termination assembly becomes tighter. Referring to FIG. 68, rather than sealing the cables to the termination assembly using o-rings, the termination assembly may include cable grips, including Belleville washer type elements 338 which are compressed as the cables and securement nuts 339 are tightened to form secure metal-to-metal seals. The conductive portions of the cable and connectors are separated from the termination housing by a shaped rubber insulation block 311.

Figure 69:
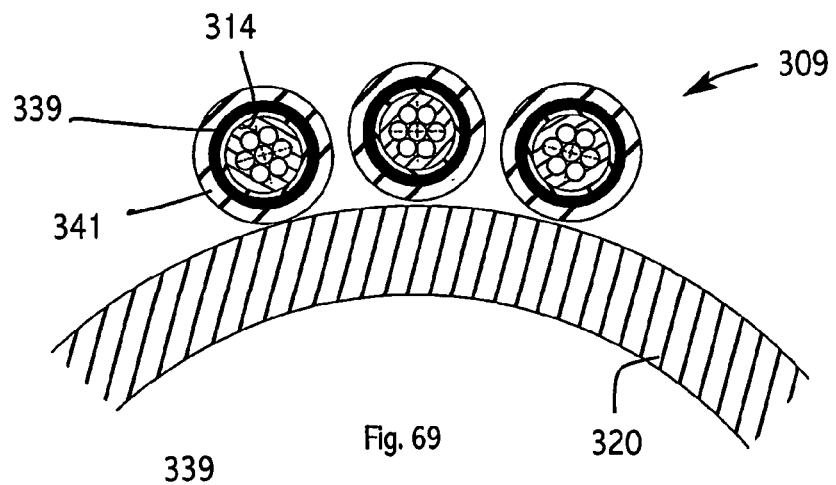
FIG. 69 shows another embodiment of the cable.
Figure 70:
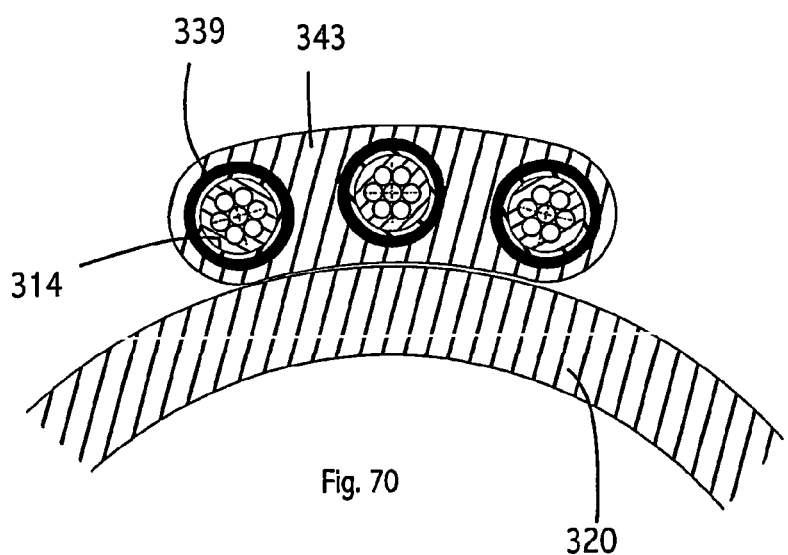
FIG. 70 shows another embodiment of the cable.
Figure 71:
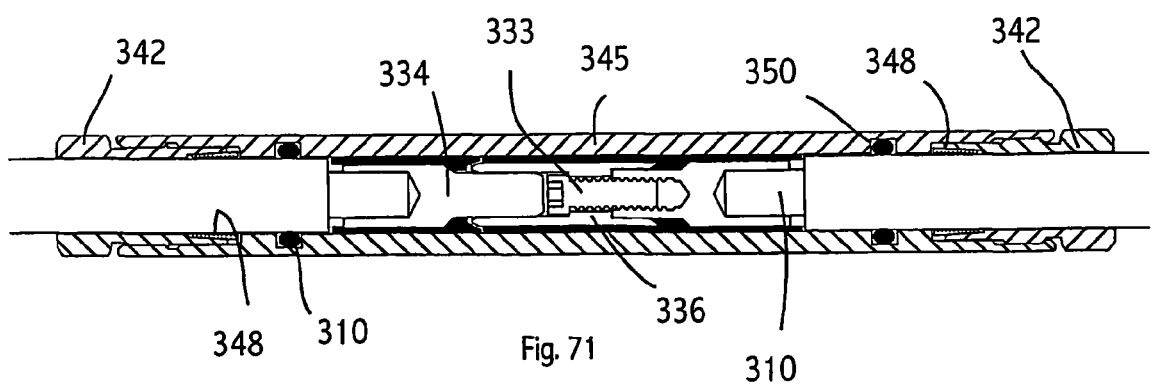
FIGS. 71 to 74 show splicing arrangements for the cable shown in FIG. 69.

Referring to FIG. 69 several individually protected cables 340 having two outer layers 339, 341 extruded upon the metal layer 314, may be introduced into the annulus formed between a casing and a piece of well equipment 320, the cables not being joined together but individually disposed down hole. Such cables may be connected to the equipment they are to power, or spliced to further lengths of cable, using individual termination or splicing assemblies, as shown in FIG. 71. As previously described, the conductive wires of a protected, cable 310 are exposed, and electrically attached to a female pin 336 using solder or crimping and a engaging screw 333. FIG. 71 shows two similar cables being spliced together, the exposed metal conductors 310 being crimped or soldered to a pin. Retaining nuts 342 at either end of the main body 345 of the termination assembly engage threaded internal surfaces 346 of the termination assembly, the internal surface of each retaining nut pressing against a wedge-shape profiled grip 348. As the retaining nut is tightened, the wedge-shape profiled grip causes the retaining nut 342 and end portion of the termination assembly 345 to be slightly outwardly displaced. This causes the portion of the termination assembly adjacent internally mounted o-rings 350 to be inwardly displaced, so ensuring the o-rings 350 form a good seal against the outer surfaces of the cables. FIG. 70 shows three protected cables, here having a layer 331 extruded individually over each cable's metal layer 314, and a block extrusion 343 in which all three cables are set. Both configurations are suitable for small annulus situations.

Figure 72:
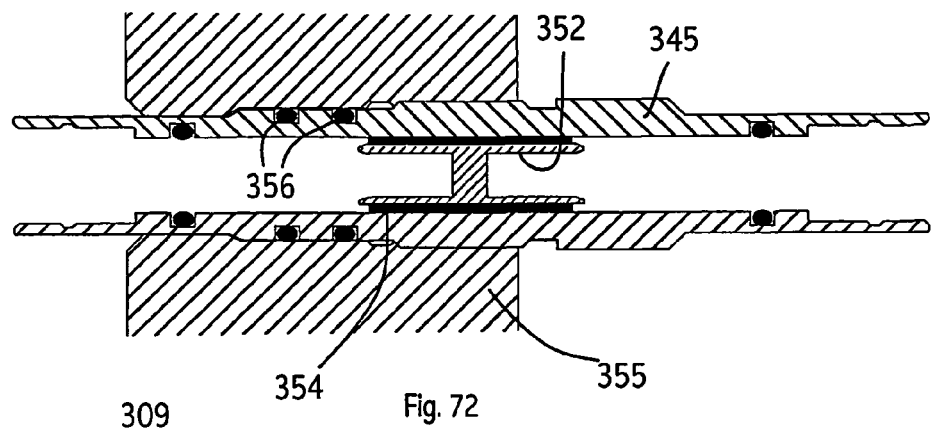
Figure 73:
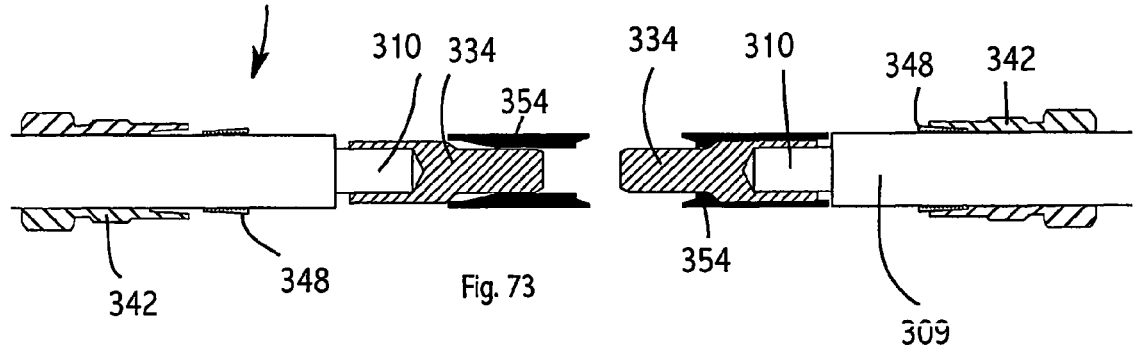
Figure 74:
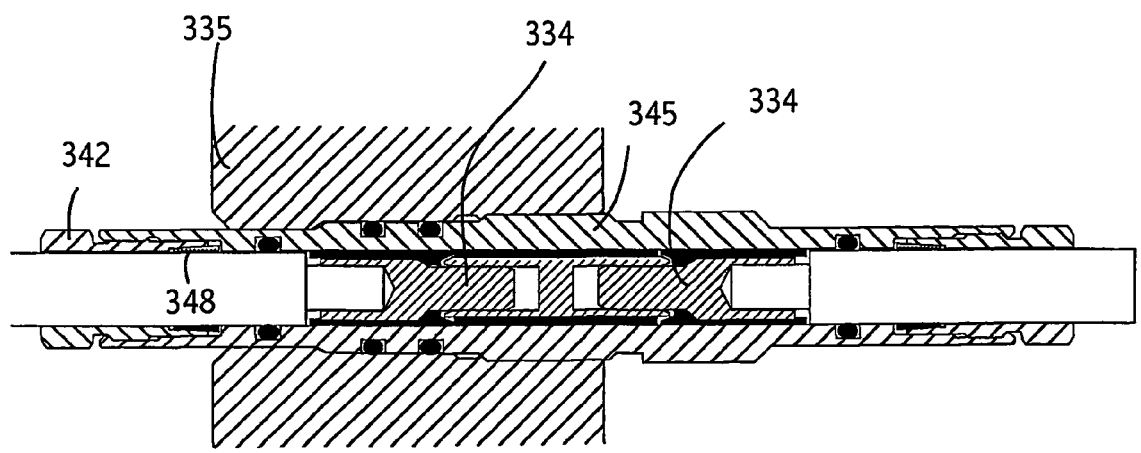

Referring to FIG. 72, a termination or splicing assembly may include a threaded profiled outer surface, and o-rings 356 on its outer surface, so that the assembly may be securely and sealable attached to a bulkhead 355, so that two cables 309, suitably prepared as described and shown in FIG. 73, may be introduced either end of the termination assembly 345 and secured using the retaining nuts as previously described, to securely attach and seal the two cable ends together as shown in FIG. 74. In this embodiment, the crimped or soldered connection elements 334 are connected via a double female ended connection socket 352, both the connection socket and each of the connection elements including profiled insulating sleeves 354 so that the conductive components are insulated from the main body 345 of the termination assembly.

Whilst aluminum and steel layers have been chosen in the embodiments to illustrate the application of a metal layer, welding technique such as laser welding allow a wide range of metals and metallic materials to be used, such as copper, stainless steel, and plastic coated or plated metals. Whenever an extrusion is being applied to the metal barrier (or the metal barrier is being applied to the cable), it may be found beneficial to include an adhesive layer, which may also be applied by extrusion, so that the bond between the metal layer and the extruded layer is firm, thereby preventing kinking and rucking due to movement between the extruded layers and the metal barrier.

The metal layer not only acts as a barrier layer, protecting the fabric of the cable against high-pressure or caustic environments, but the metal greatly increases the strength of the cable, particularly when several cables (such as those shown in FIGS. 66 and 69) are individually treated with the metal barrier layer. Although three individual cables are shown here, greater numbers of individually metal protected cables may be used. Since the cables are mechanically reinforced by the metal layer, the cables could contribute a significant amount of tensile support.

The invention claimed is:

1. A protected conduit for use in a down hole environment, comprising a first tubular metal impermeable layer, a first extrudate layer applied upon the first metal impermeable layer, and a second metal impermeable layer applied upon the first extrudate layer, a flow path being present through the first metal impermeable layer, and a conducting means for transmitting power or telemetry data being provided between the first metal impermeable layer and the second metal impermeable layer.

2. A protected conduit according to claim 1, wherein the conducting means comprises three parallel mutually insulated conductors.

3. A protected conduit according to claim 1, wherein the second tubular metal impermeable layer is formed by welding a strip of metal to form a tubular shape having an axial seam, and applied upon the first extrudate layer.

* * * * *